(12) United States Patent
Sugioka et al.

(10) Patent No.: US 7,156,014 B2
(45) Date of Patent: Jan. 2, 2007

(54) COMPRESSOR

(75) Inventors: Takahiro Sugioka, Kariya (JP);
Manabu Sugiura, Kariya (JP);
Takahiro Hoshida, Kariya (JP);
Masami Osako, Kariya (JP); Toshihisa Shimo, Kariya (JP); Hitotoshi Murase, Kariya (JP); Takayuki Kato, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 7 days.

(21) Appl. No.: 10/870,315

(22) Filed: Jun. 17, 2004

(65) Prior Publication Data
US 2004/0261611 A1 Dec. 30, 2004

(30) Foreign Application Priority Data
Jun. 19, 2003 (JP) .............................. 2003-175276
Oct. 30, 2003 (JP) .............................. 2003-370961

(51) Int. Cl.
*F01B 3/00* (2006.01)
*F01B 31/00* (2006.01)

(52) U.S. Cl. ............................................ 92/155; 92/71
(58) Field of Classification Search ................. 92/155, 92/71
See application file for complete search history.

(56) References Cited

U.S. PATENT DOCUMENTS

| 4,898,905 | A | 2/1990 | Kawakami et al. ......... 524/404 |
| 5,183,864 | A | 2/1993 | Nelb, II et al. ............ 525/452 |
| 5,356,708 | A | 10/1994 | Matsuura et al. ........... 428/375 |
| 5,556,261 | A * | 9/1996 | Kimura et al. ................. 92/71 |
| 5,700,093 | A | 12/1997 | Hiramatsu et al. .......... 384/276 |
| 5,880,205 | A | 3/1999 | Tannenbaum ............... 524/520 |
| 5,890,412 | A * | 4/1999 | Martensen et al. ............. 92/71 |
| 6,123,009 | A * | 9/2000 | Kanayama et al. ............. 92/71 |
| 6,308,615 | B1 * | 10/2001 | Takenaka et al. ............. 92/155 |
| 6,378,415 | B1 | 4/2002 | Sugiura et al. ................. 92/71 |
| 6,640,690 | B1 * | 11/2003 | Sugiura et al. ............... 92/155 |
| 6,666,128 | B1 * | 12/2003 | Sugiura et al. ............... 92/155 |
| 6,752,065 | B1 * | 6/2004 | Sugioka et al. ................. 92/71 |

FOREIGN PATENT DOCUMENTS

| EP | 0 485 979 A2 | 5/1992 |
| EP | 1 236 914 A1 | 9/2002 |
| EP | 1 253 318 A2 | 10/2002 |
| EP | 1 310 674 A2 | 5/2003 |
| JP | 60-22080 | 2/1985 |
| JP | 8-92528 | 4/1996 |
| JP | 11-106779 | 4/1999 |
| JP | 2002-89437 | 3/2002 |
| KR | 0195431 | 6/1999 |

* cited by examiner

*Primary Examiner*—Michael Leslie
(74) *Attorney, Agent, or Firm*—Morgan & Finnegan LLP

(57) ABSTRACT

A compressor has a swash plate and shoes. Surfaces of the swash plate slides on flat surfaces of the shoes. A sliding film is formed on each of the swash plate surfaces. The sliding films are formed of a polyamide-imide resin that contains at least solid lubricant. The polyamide-amide resin has a glass transition temperature of 270° C., a tensile strength at room temperature of 200 MPa, or more imide groups than amide groups. When a base portion of the swash plate is made of an aluminum-based metal, the sliding films are formed on the base portion with middle layers made of anodized aluminum in between.

14 Claims, 23 Drawing Sheets

COMPRESSOR

BACKGROUND OF THE INVENTION

The present invention relates to a compressor.

Japanese Laid-Open Patent Publication No. 2002-89437, for example, discloses a compressor having a housing in which a plurality of cylinder bores, a crank chamber, a suction chamber, and a discharge chamber are formed. The compressor is incorporated into a refrigeration circuit including an evaporator, a suction device, and a condenser. Each cylinder bore of the compressor accommodates a corresponding piston, while permitting the piston to reciprocate. A drive shaft rotatably supported by the housing is driven by an external drive source such as an engine. A swash plate is supported on the drive shaft rotatably in synchronization therewith. The swash plate is connected to the piston with pairs of hemispherical shoes. A sliding film is formed on a surface of the swash plate that slides upon a flat surface of the shoes. The sliding film is formed of a binder resin which contains a solid lubricant such as molybdenum disulfide.

When the drive shaft is driven by the external drive source, the swash plate rotates in synchronization therewith to cause each piston to reciprocate within the cylinder bore via the shoes. In each cylinder bore, a compression chamber is defined that changes in volume depending on reciprocating movement of a piston head. When the piston moves from the top dead center to the bottom dead center, a low pressure refrigerant gas is drawn into the compression chamber from the suction device connected to the evaporator in the refrigeration circuit. On the other hand, when the piston moves from the bottom dead center to the top dead center, a high pressure refrigerant gas is discharged into the discharge chamber from the compression chamber. The discharge chamber is connected to the condenser in the refrigeration circuit. The refrigeration circuit is used for air conditioning of a vehicle as an air conditioning system for a vehicle.

For this compressor, the sliding film applied to the surface of the swash plate allows the flat surface of the shoe to smoothly slide, thus preventing rattles of the swash plate and the shoes by wear of at least one of them or failures resulting from seizure therebetween.

In the conventional compressor, further improved sliding properties are desired under severe conditions such as where not only the surface of the swash plate and the flat surface of the shoes, but also a first sliding surface of a first member and a second sliding surface of a second member slide upon each other at high speed or under a relatively heavy load such as a high heat load. Particularly, when carbon dioxide is used as a refrigerant, the improved sliding properties are much desired. Thus, it can be considered to increase the content of solid lubricant, for example, to increase the content of molybdenum disulfide in the sliding film to 10% by mass or more and thereby improve seizure resistance between the first member and the second member. However, if the content of solid lubricant is increased, the solid lubricant will be apt to drop off of the film, resulting in increased wear depth of the sliding film.

SUMMARY OF THE INVENTION

An object of the invention is to provide a compressor having good sliding properties.

In order to achieve the above described object, the present invention provides a compressor including a first member, a second member, and a slidn film. The first member has a first sliding surface. The second member has a second sliding surface. One of the first and second sliding surface slides on the other. The sliding film is formed on at least one of the first and second sliding surface. The sliding film is formed of a polyamide-imide resin containing solid lubricant. At least one of the following requirements is satisfied:

(I) the glass transition temperature of the polyamide-imide resin is no less than 270° C., (II) the tensile strength of the polyamide-imide resin at room temperature is no less than 200 MPa, and (III) the polyamide-imide resin contains more imide groups than amide groups.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
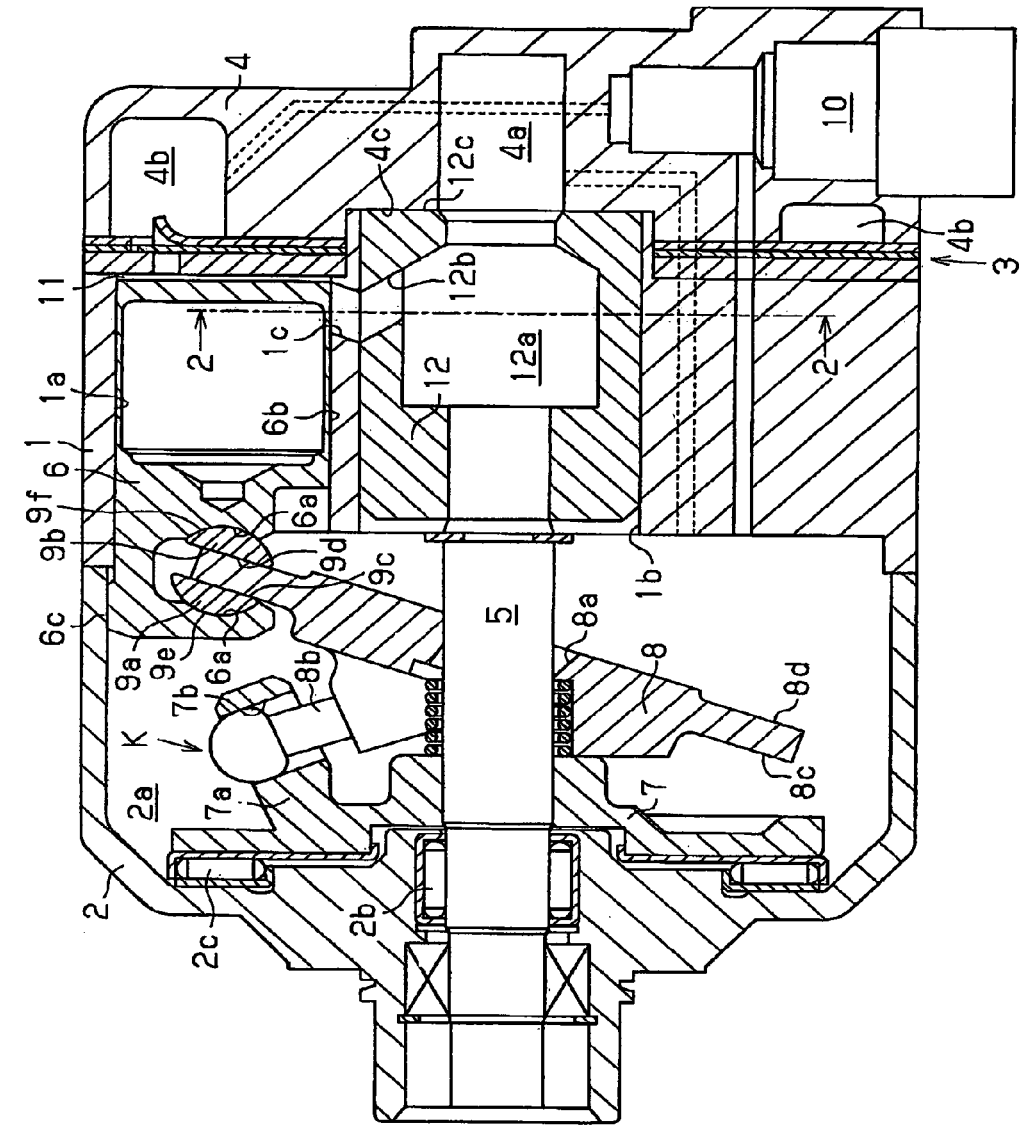
FIG. 1 is a cross-sectional view illustrating a compressor according to a first embodiment of the present invention.

Several embodiments of the present invention will now be described with reference to the drawings. Like or the same reference numerals are given to those components that are like or the same in the drawings.

A first embodiment of the invention will be described with reference to FIGS. 1 to 16.

As shown in FIG. 1, a variable displacement swash plate type compressor includes a cylinder block 1 made of an aluminum-based alloy, a front housing member 2 made of an aluminum-based alloy and secured to a front end of the cylinder block 1, and a rear housing member 4 made of an aluminum-based alloy and secured to a rear end of the cylinder block 1 via a valve mechanism 3 including a valve plate, a discharge valve, and a retainer. A crank chamber 2a is defined between the cylinder block 1 and the front housing member 2. A suction chamber 4a and a discharge chamber 4b are defined in the rear housing member 4. In this embodiment, the cylinder block 1, the front housing member 2, and the rear housing member 4 constitute the housing. The suction chamber 4a is connected to an evaporator (not shown), the evaporator is connected to a condenser (not shown) via an expansion valve (not shown), and the condenser is connected to the discharge chamber 4b. The compressor, the evaporator, the expansion valve, and the condenser constitute an air conditioning refrigeration circuit for a vehicle. In the drawings, the left is the front side, and the right is the rear side.

Figure 2:
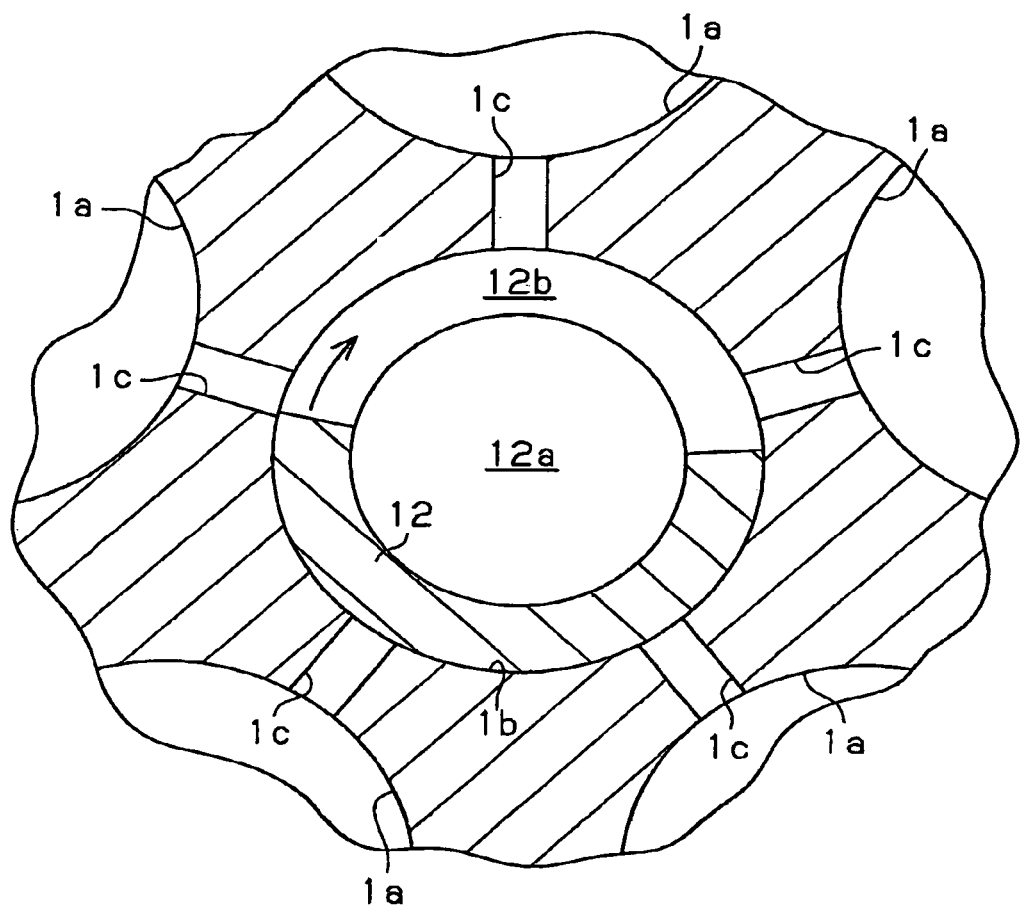
FIG. 2 is a cross-sectional view taken along line 2—2 of FIG. 1.

In the front housing member 2, a drive shaft 5 made of an iron-base alloy is rotatably supported with a radial bearing 2b. As shown in FIG. 2, a plurality of cylinder bores 1a (only one is shown in FIG. 1) are formed at constant intervals around an axis L of the drive shaft 5. Each cylinder bore 1a accommodates a corresponding single-headed piston 6 made of an aluminum-based alloy, while permitting the piston 6 to reciprocate. In each cylinder bore 1a, a compression chamber 11 is defined that changes in volume depending on reciprocation of the piston 6. As shown in FIG. 1, a rotary valve chamber 1b extending in parallel with the axis L of the drive shaft 5 passes through a center of the cylinder block 1. The rotary valve chamber 1b accommodates a rotary valve 12 rotatably in synchronization with the drive shaft 5. The rotary valve 12 has an introduction chamber 12a communicating with the suction chamber 4a, and a suction guide groove 12b communicating with the introduction chamber 12a. The suction guide groove 12b extends radially. The cylinder block 1 has a plurality of radially extending suction passages 1c that connect the compression chamber 11 of each cylinder bore 1a with the introduction chamber 12a via the suction guide groove 12b (see FIG. 2).

A lug plate 7 made of an iron-base alloy is secured onto the drive shaft 5 in the crank chamber 2a. A thrust bearing 2c is provided between the lug plate 7 and the drive shaft 5. A swash plate 8 made of an iron-base alloy is supported on the drive shaft 5. The swash plate 8 slides along and is inclined with respect to the axis L of the drive shaft 5. A hinge mechanism K is located between the lug plate 7 and the swash plate 8. The swash plate 8 is connected to the lug plate 7 via the hinge mechanism K. The hinge mechanism K rotates the swash plate 8 integrally with the lug plate 7 and also guides the slide and the inclination of the swash plate 8 with respect to the axis L of the drive shaft 5.

The hinge mechanism K includes a pair of guide holes 7b and a pair of guide pins 8b. The lug plate 7 has a pair of arms 7a, and each guide hole 7b is formed in one of the arms 7a, respectively. The guide pins 8b are fixed to the swash plate 8. Each guide pin 8b has, at its tip, a spherical part, which is fitted in the corresponding one of the guide holes 7b. A through hole 8a passes through a center of the swash plate 8, and the drive shaft 5 is inserted into the through hole 8a.

Pairs of hemispherical shoes 9a and 9b made of an iron-base alloy are provided on an outer periphery of the swash plate 8. An end of each piston 6 is connected to the outer-periphery of the swash plate 8 via a pair of the shoes 9a, 9b. Thus, rotation of the swash plate 8 is converted into reciprocation of the piston 6 depending on inclination angle of the swash plate 8.

The rear housing member 4 accommodates a control valve 10 connected to the suction chamber 4a, the discharge chamber 4b, and the crank chamber 2a. The control valve 10 controls pressure in the crank chamber 2a. Depending on the pressure control, the inclination angle of the swash plate 8 is changed to control the displacement of the compressor.

Figure 3:
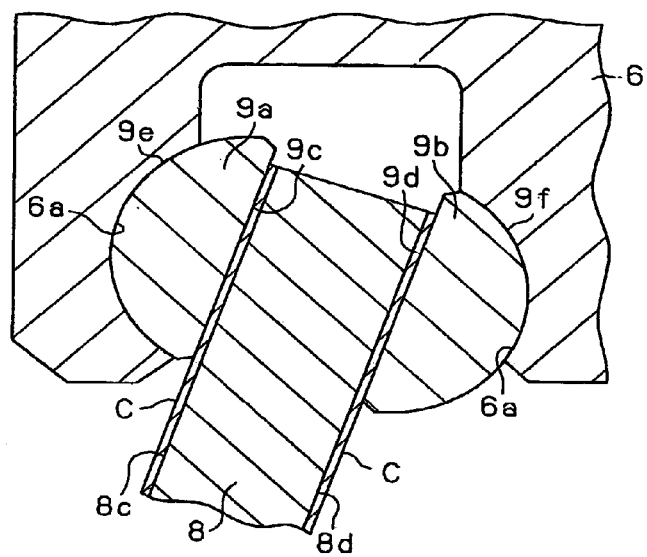
FIG. 3 is a cross-sectional view of a swash plate and shoes of the compressor shown in FIG. 1, illustrating sliding surfaces of the shoes and the swash plate.

As shown in FIG. 3, the swash plate 8 has front and rear peripheral surfaces 8c, 8d on which flat surfaces 9c, 9d of the shoes 9a, 9b slide. A sliding film C is formed on each of the front and rear surfaces 8c, 8d. The sliding film C is formed in the following manner.

First, the following ingredients are prepared.

That is, solid lubricant, for example, polytetrafluoroethylene (PTFE) powder, molybdenum disulfide ($MoS_2$), graphite, and a binder resin are prepared. The solid lubricant is PTFE powder, and the binder resin is a polyamideimide (PAI) resin varnish of a test article I. The PAI resin varnish contains 30% by mass of a PAI resin, 70% by mass of a solvent. The solvent contains 56% by mass of n-methyl-2-pyrrolidone, 14% by mass of xylene. The number average molecular weight of the PAI resin is no less than 20,000. The PAI resin varnish of the test article I contains more imide groups than amide groups.

In the sliding film C of this embodiment, the volume of the solid lubricant is preferably in a range that corresponds to a range of the volume ratio of the solid lubricant to the binder resin between 40:60 to 60:40. If the volume of the solid lubricant is less than a value that corresponds to a volume ratio of the solid lubricant to the binder resin of 40:60, the sliding film has an insufficient seizure resistance. On the other hand, if the volume of the solid lubricant is more than a value that corresponds to a volume ratio of the solid lubricant to the binder resin of 60:40, the seizure resistance of the sliding film cannot be significantly improved, and the solid lubricant is likely to drop off. This results in increased wear depth of the sliding film.

Figure 4:
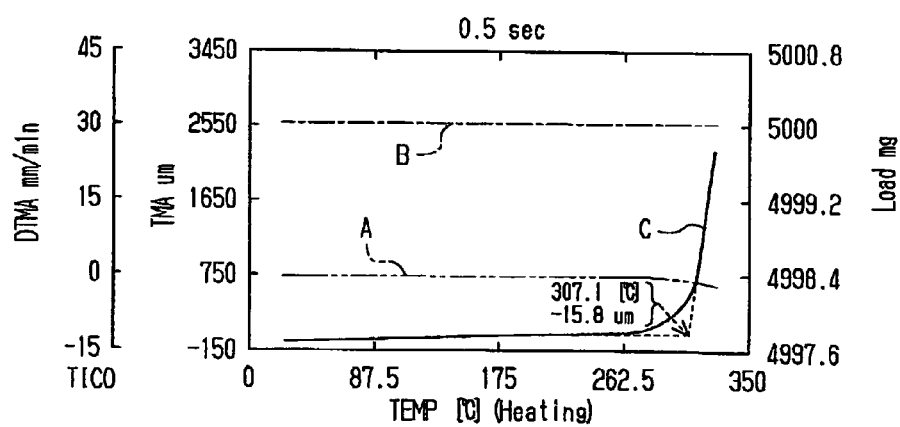
FIG. 4 is graph showing the results of thermomechanical measurements of a PAI resin used in a test article 1 of a test (i)

The PAI resin varnish was baked at 200° C. for sixty minutes to form the PAI resin. Then, the PAI resin was subjected to thermomechanical measurement with a thermomechanical analyzer (TMA), a product of Seiko Instruments Inc. The results of the measurements are shown in FIG. 4. The conditions of the measurements were as follows: the jig was a tension type; the distance between chucks was 10 mm; the temperature was varied from a room temperature (25° C.) to 400° C.; the rate of increase of temperature was 10° C./minute; the tensile load was 5 g, and; the size of the sample was 2 mm in width and 30 mm in length, 20 µm in thickness. Line A represents elongation per unit time, line C represents the amount of elongation, and line B represents the load. As obvious form FIG. 4, the glass transition temperature of the PAI resin is 307.1° C.

According to the results of the tests carried out by the present inventors, a PAI resin having a glass transition temperature no less than 270° C. is preferably used. It is more preferable to use a PAI resin having a glass transition temperature no less than 290° C. Also, a PAI resin having a tensile strength no less than 200 MPa at room temperature is preferably used.

Figure 5:
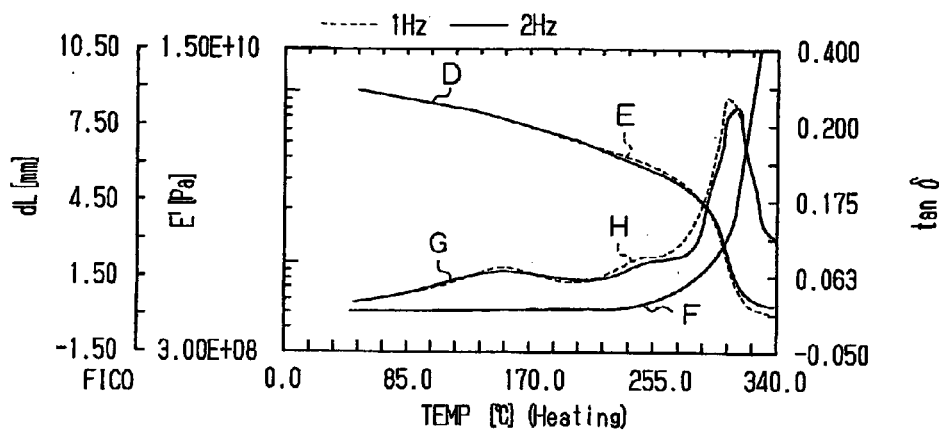
FIG. 5 is graph showing the results of dynamic viscoelasticity measurements of PAI resin used in the test article 1 of the test (i)

The PAI resin varnish was baked at 200° for sixty minutes to form the PAI resin. Then, the PAI resin was subjected to dynamic viscoelasticity measurement with a dynamic mechanical analyzer (DMA), a product of Seiko Instruments Inc. The results of the measurements are shown in FIG. 5. The conditions of the measurements were as follows: the jig was a tension type; the distance between chucks was 20 mm; the temperature was varied from a room temperature (25° C.) to 400° C.; the measuring frequencies were 1 Hz and 2 Hz, the rate of increase of temperature was 3° C./minute; the tensile load was 5 g, and; the size of the sample was 4 mm in width and 40 mm in length, 20 µm in thickness. Broken line in the graph represents data of the measurement at the measuring frequency of 1 Hz, solid line represents data of the measurement at the measuring frequency of 2 Hz. Line D and line E each represent storage elastic modulus, line F represents the elongation of the resin, and lines G and H each represent $tan\delta$. As obvious from FIG. 5, the PAI resin has a tensile strength of 249 MPa (storage elastic modulus at 250° C. is $3.39 \times 10^9$ Pa). 50% by volume of the PAI resin, 18% by volume of the PTFE powder, 18% by volume of $MoS_2$, and 14% by volume of graphite are mixed. After being sufficiently agitated, the mixture is sent to a three-roll mill. Accordingly, a sliding member coating composition of the test article I is produced.

Thereafter, a degreased swash plate 8 made of an iron-based alloy is prepared. The coating composition is then applied to the front and rear peripheral surfaces 8c, 8d of the swash plate 8. Specifically, the coating composition is transferred onto the swash plate 8 through roll coating. The swash plate 8 was then heated at 200° C. for sixty minutes under atmospheric conditions, thereby hardening unhardened binder resin. In this manner, the swash plate 8 that has the sliding film C formed of the binder resin containing the solid lubricant on the front and rear peripheral surfaces 8c, 8d was obtained. The solid lubricant is dispersed in the binder resin to form the sliding film C. The compressor is assembled using the obtained swash plate 8. In this embodiment, the sliding member coating composition is transferred to the front and rear surfaces 8c, 8d of the swash plate 8 through roll coating. However, the composition may be applied with an air spray.

The compressor thus constructed is mounted on a vehicle with its drive shaft 5 coupled to a pulley or an electromagnetic clutch. The pulley or the electromagnetic clutch is driven by an engine or an electric motor with a belt. When the engine or the motor is operating, if the drive shaft 5 is rotated, the swash plate 8 wobbles. Accordingly, each piston 6 reciprocates in the associated cylinder bore la at a stroke corresponding to the inclination angle of the swash plate 8. As the drive shaft 5 is rotated, the rotary valve 12 is rotated. When the rotary valve 12 is rotated, in accordance with reciprocation of each piston 6, the introduction chamber 12a is selectively connected to and disconnected from the associated compression chamber 11 through the suction guide groove 12b and the associated suction passage 1c. Therefore, when each piston 6 is moved from the top dead center to the bottom dead center, the associated compression chamber 11 is connected to the introduction chamber 12a, so that refrigerant gas is supplied to the compression chamber 11 from the evaporator through the suction chamber 4a and the introduction chamber 12a. On the other hand, when each piston 6 moves from the bottom dead center to the top dead center, the introduction chamber 12a is disconnected from the compression chamber 11, so that refrigerant gas is compressed in the compression chamber 11. Thereafter, the compressed gas is discharged to the condenser through the discharge chamber 4b.

The sliding films C on the surfaces 8c, 8d of the swash plate 8 impart seizure resistance to the swash plate 8 and the shoes 9a, 9b, as in the prior art. Particularly, since the PAI resin used in the sliding films C contains more imide groups than amide groups, the PAI resin has a high glass transition temperature and a high tensile strength. Thus, the sliding films C exhibit an improved sliding performance under harsh environments.

The inventors carried out the following examinations regarding the aforementioned effects. A conventional PAI resin is produced in the following manner. That is, a trimellitic anhydride (TMA) represented by structural formula 1 is caused to react with 4,4'-diphenylmethane diisocyanate (MDI) represented by structural formula 2. A PAI resin thus obtained has substantially the same number of imide groups and amide groups as shown in structural formula 3.

[Structural Formula 1]

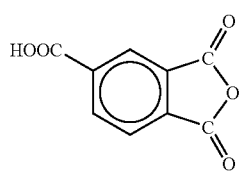

[Structural Formula 2]

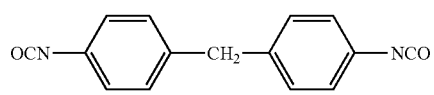

[Structural Formula 3]

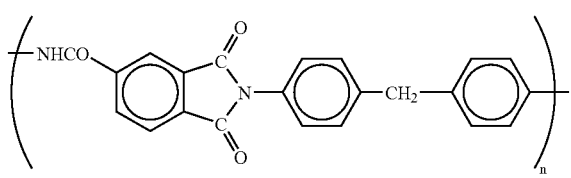

In contrast, to obtain a PAI resin having a high heat resistance, a high elasticity, a high mechanical strength, and a low thermal expansion coefficient, the isocyanate component is changed. The TMA of structural formula 1 is caused to react with 3,3'-dimethylbiphenyl-4,4'-diisocyanate (TODI) of structural formula 4. The PAI resin thus obtained has a high strength and a high heat resistance. If approximately half of MDI is replaced by TODI though a conventional method, the glass transition temperature of the PAI resin will be sufficient as a sliding member coating composition. The PAL resin is preferably formed by adding 5% to 90% by mol of TODI in the whole isocyanate component in the crude materials and causing the isocyanate component to react. Since the relatively costly TODI is used in this method, the production costs are inevitably increased.

[Structural Formula 4]

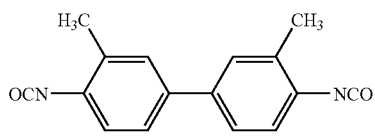

The TMA of structural formula 1 is caused to react with the MDI of structural formula 2 and 3,3',4,4'-benzophenonetetracarboxylic acid dianhydride (BTDA) represented by structural formula 5. To obtain a PAI resin having a high heat resistance, a high elasticity, a high mechanical resistance, and a low thermal expansion coefficient, the isocyanate component is changed. The TMA of structural formula 1 is caused to react with the TODI of structural formula 4 and the BTDA of the structural formula 5. Since the BTDA provides a great number of imide groups, the PAI resin thus produced contains more imide groups than amide groups. The PAI resin that has more imide groups than amide groups strongly exerts the characteristics of polyimide. That is, the PAI resin has a high elasticity, a high heat resistance, and a high extensibility. However, since imide groups do not dissolve in n-methyl-2-pyrrolidone, the amount of the imide groups cannot be increased beyond a value that corresponds to a ratio of amide groups to imide groups of 35:65. Since the relatively costly BTDA is used in this method, the production costs are inevitably increased.

[Structural Formula 5]

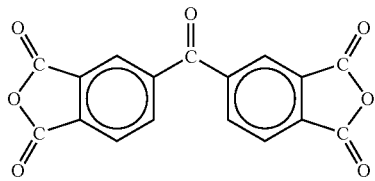

Under harsh environments, that is, even if the swash plate 8 and the shoes 9a, 9b slide on each other at a high speed or under a relatively high load, the sliding film C on the surfaces 8c, 8d of the swash plate 8 permit the flat surfaces 9c, 9d of the shoes 9a, 9b to smoothly slide. Thus, rattles of the swash plate 8 and the shoes 9a, 9b by wear of at least one of them or failures resulting from seizure therebetween are prevented.

(Test (i))

Figure 6:
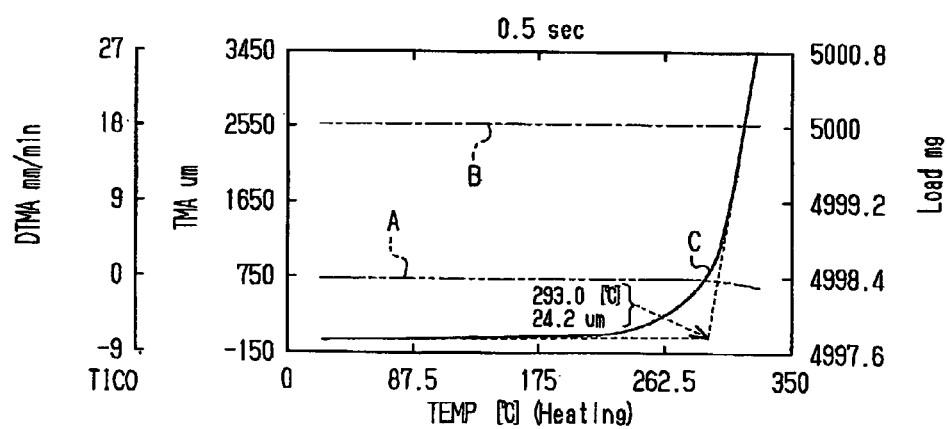
FIG. 6 is graph showing the results of thermomechanical measurements of PAI resin used in a test article II of the test (i)
Figure 7:
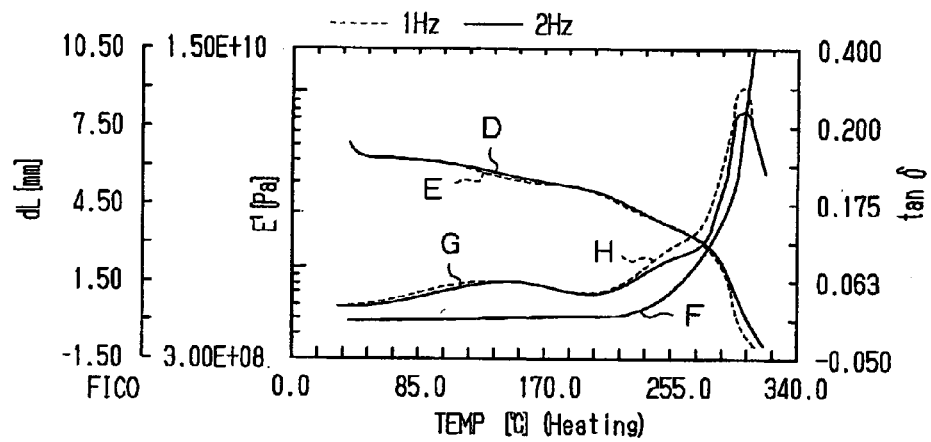
FIG. 7 is graph showing the results of dynamic viscoelasticity measurements of PAI resin used in the test article II of the test (i)
Figure 8:
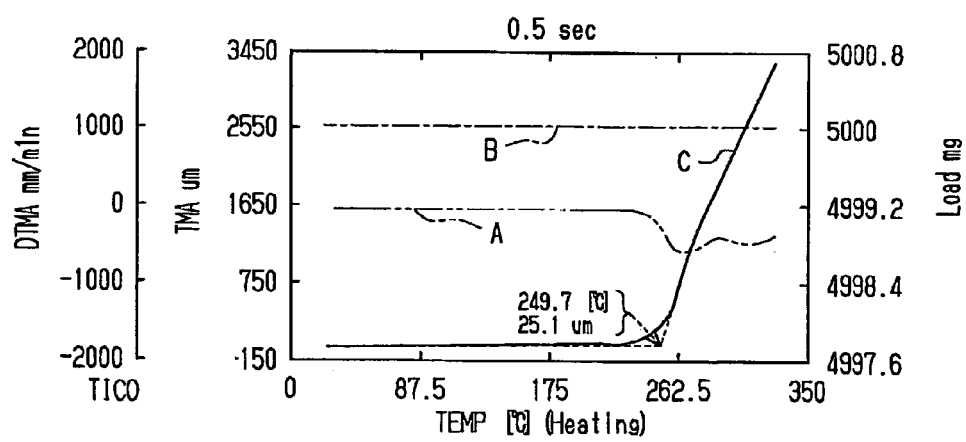
FIG. 8 is graph showing the results of thermomechanical measurements of PAI resin used in a comparison article of the test (i)
Figure 9:
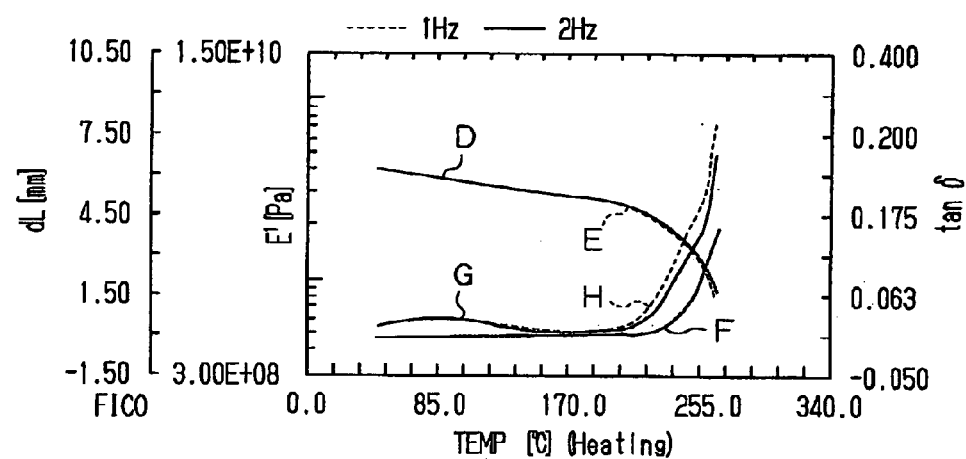
FIG. 9 is graph showing the results of dynamic viscoelasticity measurements of a PAI resin used in the comparison article of the test (i)

The above effects were confirmed through the following test (i). First, in addition to the PAI resin varnish of the test article I, a PAI resin varnish (test article II) that contains more imide groups than amide groups, and a PAI resin varnish (comparison article) that contains substantially the same number of imide groups and amide groups were prepared. FIG. 6 shows the results of the TMA measurements of the PAI resin of the test article II, and FIG. 7 shows the results of the DMA measurements of the PAI resin of the test article II. FIG. 8 shows the results of the TMA measurements of the PAI resin of the comparison article, and FIG. 9 shows the results of the DMA measurements of the PAI resin of the comparison article. As shown in FIGS. 6 to 9, the glass transition temperature of the PAI resin of the test article II is 293.0° C., while the glass transition temperature of the PAI resin of the comparison article is 249.7° C. Further, the tensile strength of the PAI resin of the test article II is 200 MPa (storage elastic modulus at 250° C. is $1.75 \times 10^9$ Pa), while the tensile strength of the PAI resin of the comparison article is 150 MPa (storage elastic modulus at 250° C. is $1.39 \times 10^9$ Pa).

As solid lubricant, PTFE powder, molybdenum disulfide ($MOS_2$), and graphite are prepared.

Mixtures were formed each containing 18% by volume of the PTFE powder, 18% by volume of $MoS_2$, and 14% by volume of graphite, and 50% by volume of the PAI resin varnish of the test article I, the test article II, or the comparison article. After being sufficiently agitated, the mixtures were each sent to a three-roll mill. Accordingly, sliding member coating compositions of the test articles I, II and the comparison article were produced. The coating compositions each may be diluted with a solvent, which is, for example, n-methyl-2-pyrrolidone, xylene, or the mixture of these, as necessary in order to adjust the viscosity and the solid concentration in accordance with the type of coating (spray coating, roll coating).

Figure 10:
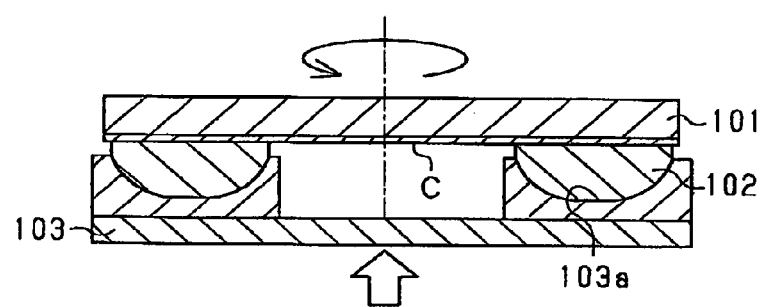
FIG. 10 is a cross-sectional view illustrating a test apparatus of the test (i)

Then, as shown in FIG. 10, a plurality of disk-shaped swash plates 101 made of degreased aluminum alloy A390 were prepared. One surface of each swash plate 101 was coated with the coating compositions using an air spray to form a film having a thickness of 25 μm. Instead of using an air spray, the compositions may be transferred onto the surface through roll coating. Each swash plate 101, on which the film was formed, was then heated at 200° C. for sixty minutes under atmospheric conditions, thereby hardening the PAI resins. In this manner, the sliding films C of the test articles I, II and the comparison article were formed on the swash plates 101.

A plurality of shoes 102 made of degreased iron-based alloy SUJ2, the number of which was two in this embodiment, were prepared. Further, a jig 103 having two hemispherical seats 103a for receiving the hemispherical portions of the shoes 102 was prepared. The jig 103 was placed with the openings of the hemispherical seats 103a facing upward. Each shoe 102 was placed in the hemispherical seats 103a at the hemispherical portion, respectively. Then, the swash plate 101 was placed such that the sliding film C contacted the flat portions of the shoes 102. Subsequently, while applying a load of 1.96 kN between the jig 103 and the swash plate 101, the swash plate 101 was rotated at a peripheral velocity of 10.6 m/second. No lubricating oil was supplied. A thermocouple (not shown) was provided between each hemispherical seat 103a and the flat portion of the corresponding shoe 102.

Figure 11:
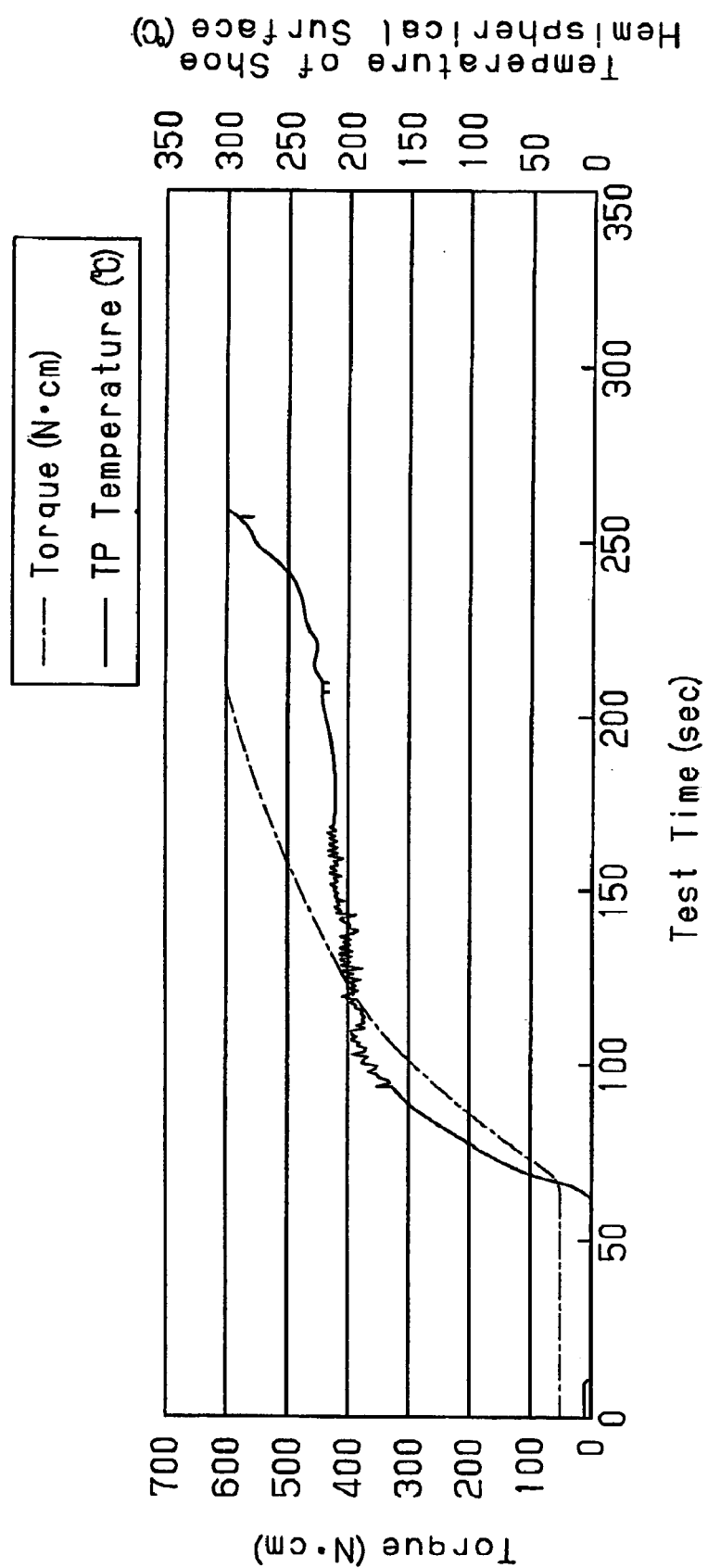
FIG. 11 is a graph showing the results of a first test for the test article I of the test (i)
Figure 12:
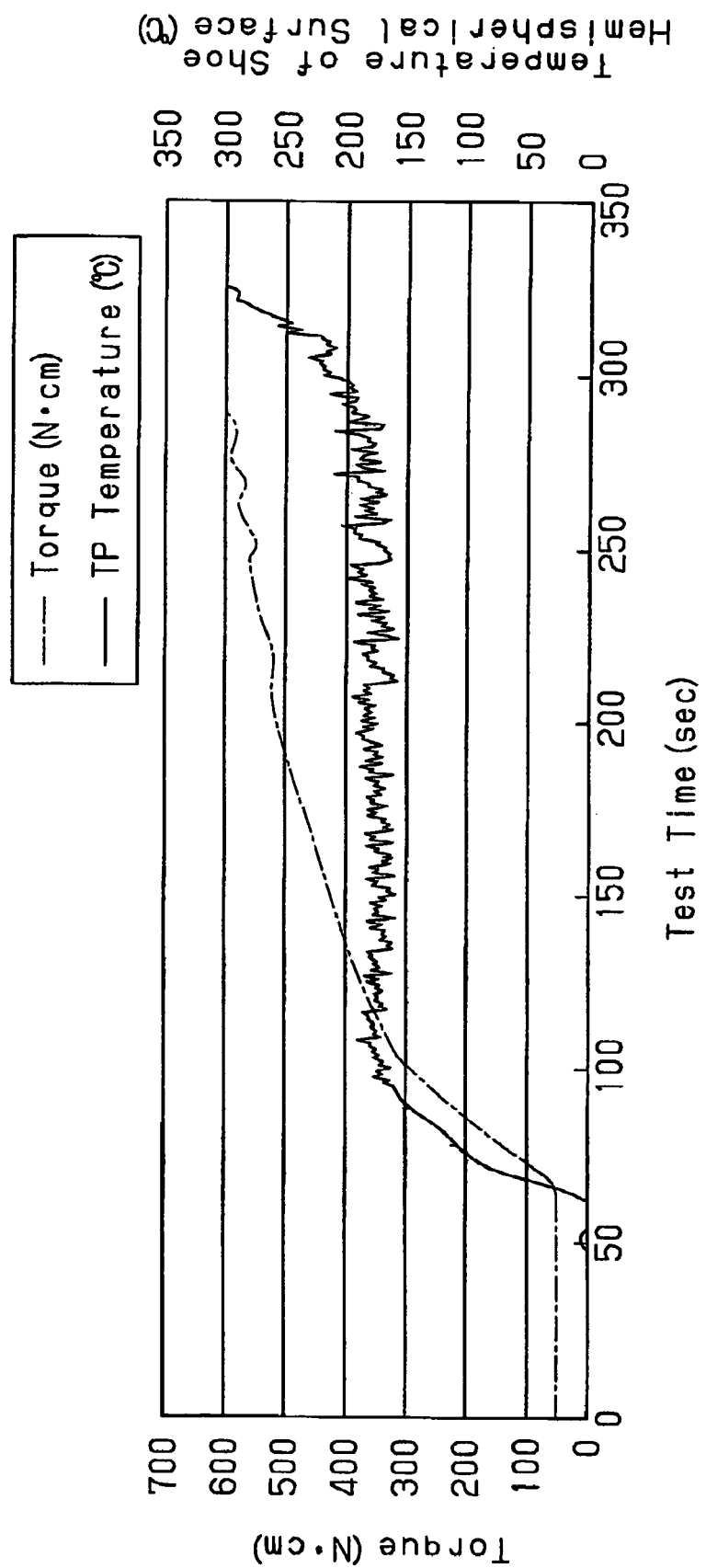
FIG. 12 is a graph showing the results of a second test for the test article I of the test (i)
Figure 13:
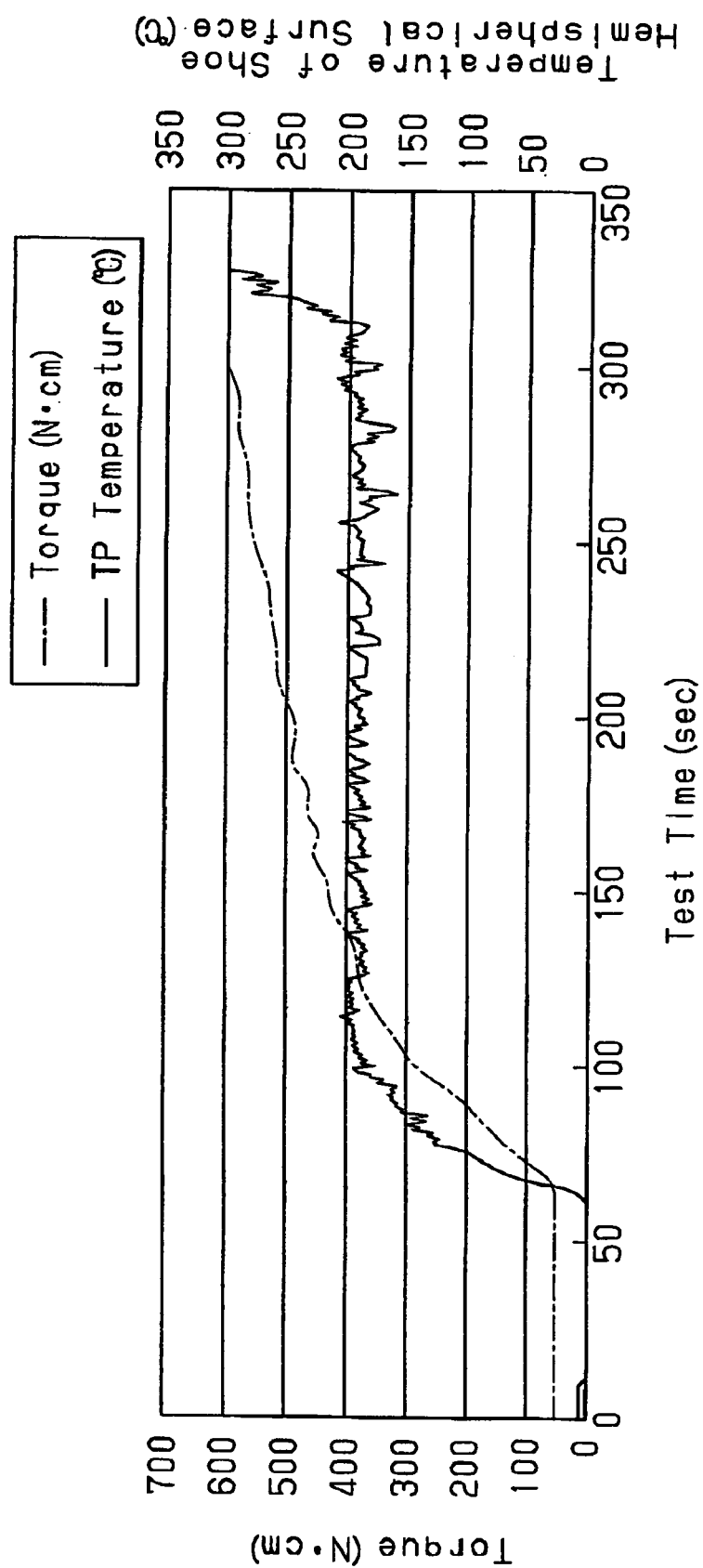
FIG. 13 is a graph showing the results of a first test for the test article II of the test (i)
Figure 14:
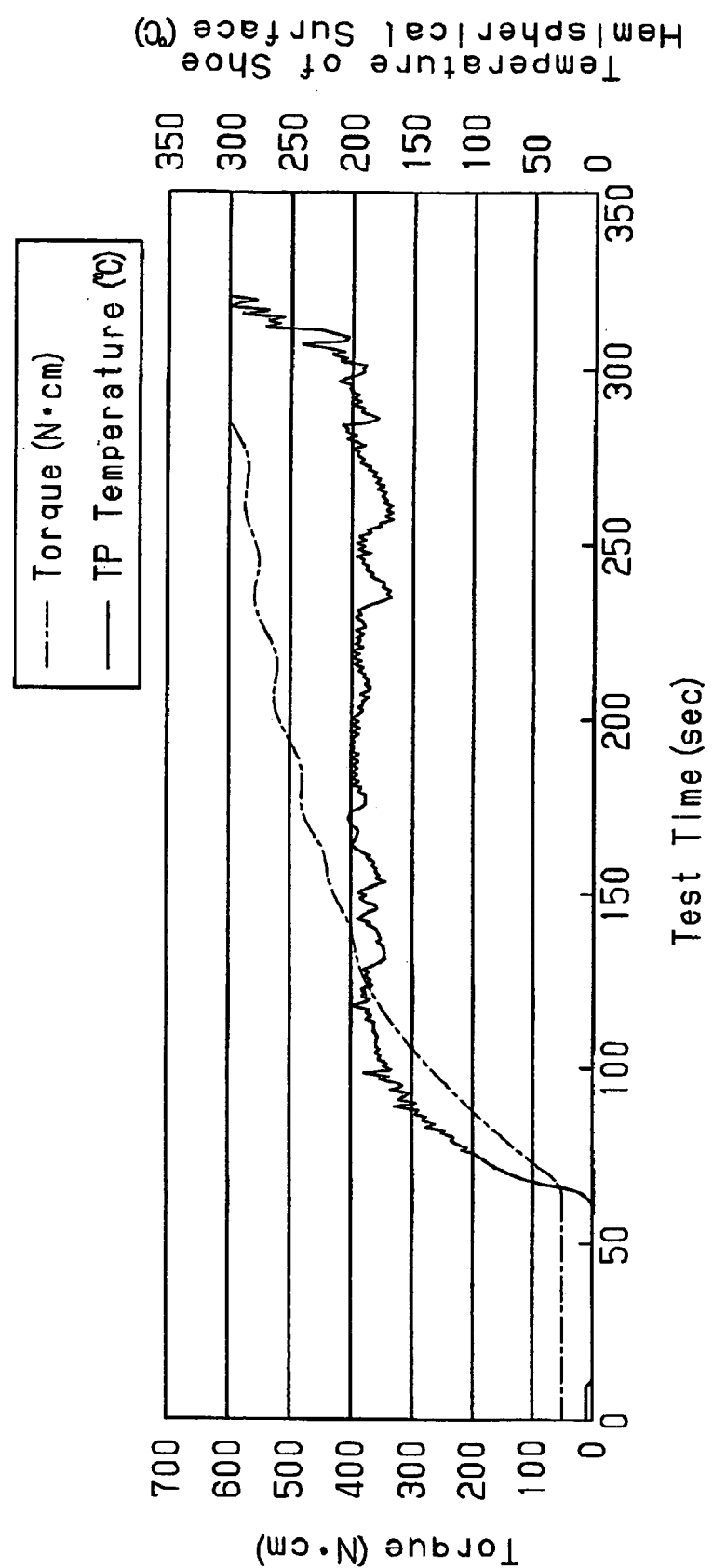
FIG. 14 is a graph showing the results of a second test for the test article II of the test (i)
Figure 15:
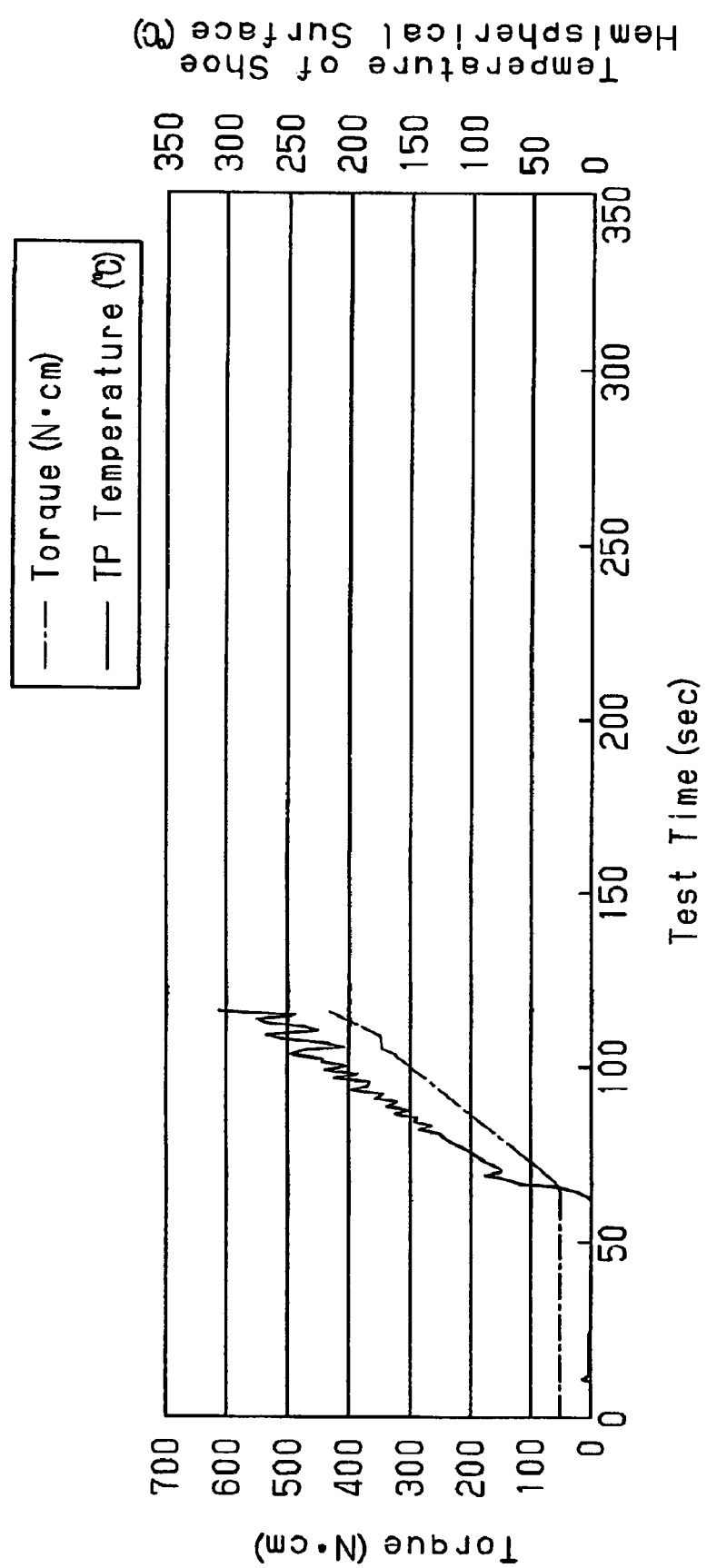
FIG. 15 is a graph showing the results of a first test for the comparison article I of the test (i)
Figure 16:
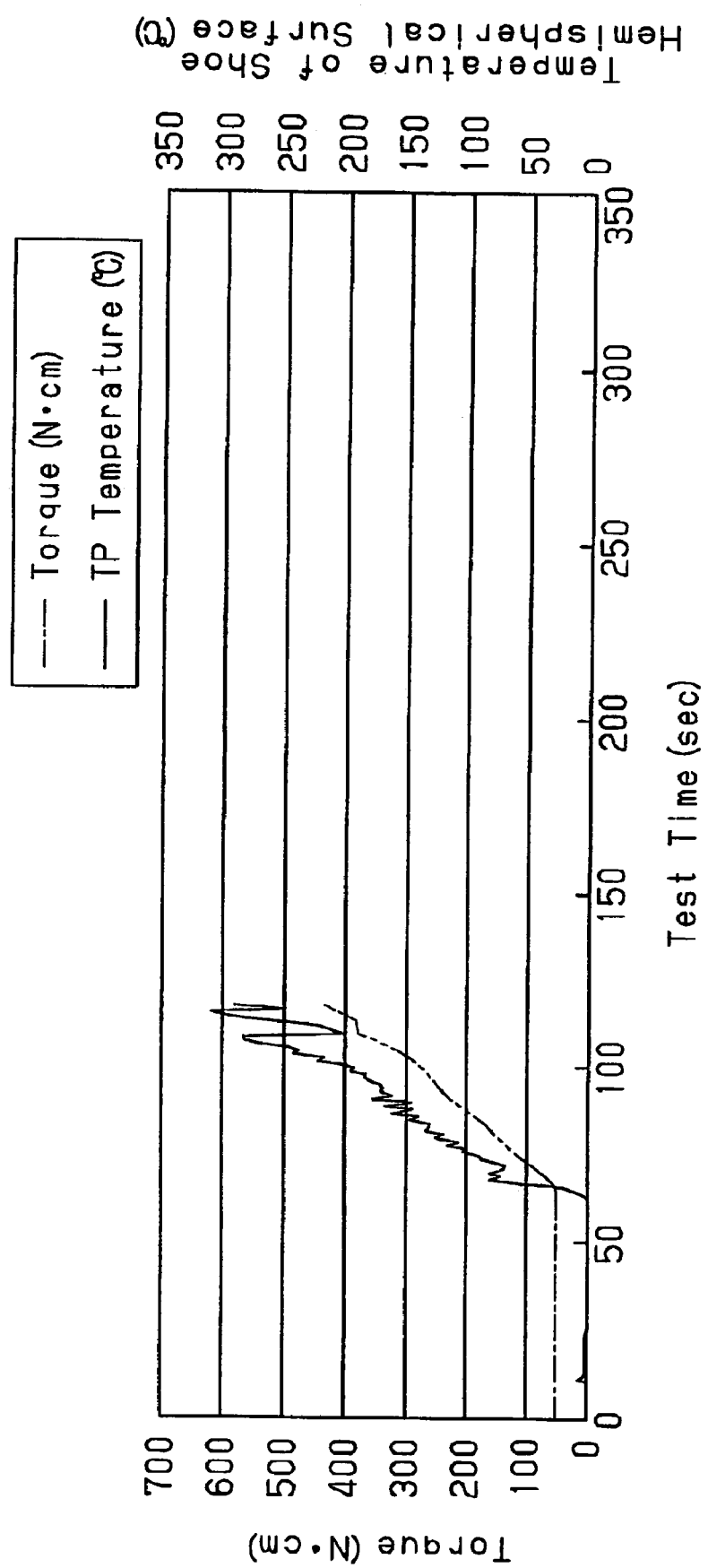
FIG. 16 is a graph showing the results of a second test for the comparison article I of the test (i)

In this manner, the relationship among the duration of the tests (seconds), the torque (N·cm), and the temperature (TP temperature: ° C.) of the hemispherical surfaces of the shoes 102 were obtained regarding the sliding films C of the test articles I, II and the comparison article. The results are shown in FIGS. 11 to 16. FIG. 11 shows the results of the first test on the sliding film C of the test article I, and FIG. 12 shows the results of the second test on the sliding film C of the test article I. FIG. 13 shows the results of the first test on the sliding film C of the test article II, and FIG. 14 shows the results of the second test on the sliding film C of the test article II. FIG. 15 shows the results of the first test on the sliding film C of the comparison article, and FIG. 16 shows the results of the second test on the sliding film C of the comparison article.

As shown in FIGS. 11 to 14, in the tests of the sliding films C of the test articles I, II with no lubrication, the torque did not reach 600 N·cm before 200 to 300 seconds elapsed, and the films C were unlikely to seize. The range of the temperature of the hemispherical surfaces of the shoes 102 was no less than 200° C. and no more than 225° C. In contrast to this, in the sliding film C of the comparison article, the torque reached 600 N·cm at about 110 seconds, and seizure is likely to occur. At this time, the temperature of the hemispherical surfaces of the shoes was approximately 220° C. The results show that the sliding films C of the test articles I, II are capable of exerting a better sliding performance in harsh environments. Also, the results show that the sliding films C are softened when the temperature substantially reaches the temperature of the glass transition, and seizure occurs.

That is, if the sliding films C made of the PAI resin varnishes of the test articles I, II are used, the compressor exerts a better sliding performance than the case where the sliding films C of the PAI resin varnish of the comparison test are used. This is because at least part of the solid lubricant is PTFE powder.

A compressor according to a second embodiment of the present invention will now be described with reference to FIGS. 17 and 18. Like or the same reference numerals are given to those components that are like or the same as the corresponding components of the embodiment of FIGS. 1 to 16 and detailed explanations are omitted.

A swash plate 8 of the second embodiment has a base portion 81 made of an aluminum-based alloy, sliding films C of the test article I or II, and middle layer M made of anodized aluminum. Each middle layer M is formed between the base portion 81 and one of the films C.

The middle layers M are formed in the following manner. First, a swash plate 8 made of a degreased aluminum alloy A390 is prepared. The swash plate 8 is immersed for thirty minutes in a sulfuric acid solution having a temperature of 15° C. and a current density of 1.0 A/cm². This forms a base portion 81 and a middle layer M having a thickness of 8 μm made of anodized aluminum on the front and rear side of the base portion 81. Consequently, the swash plate 8 in which the sliding film C made of the test article I or II is produced. The compressor is assembled with the thus produced swash plate 8.

A compressor according to a third embodiment of the present invention will now be described with reference to FIGS. 17 and 18. The third embodiment is the same as the second embodiment except the configuration of the middle layer M.

The middle layers M are formed in the following manner. First, the swash plate 8 used in the embodiment of FIG. 17 is prepared. The surfaces of the swash plate 8 are subjected to a chemical treatment using acid or alkali. This forms a base portion 81 and a middle layer M having a thickness of 4 μm made of an etched layer on the base portion 81. On the middle layer M, a sliding film C made of the test article I or II is formed to obtain the swash plate 8. The obtained swash plate 8 is assembled in the compressor shown in FIG. 1.

(Test (ii))

Figure 17:
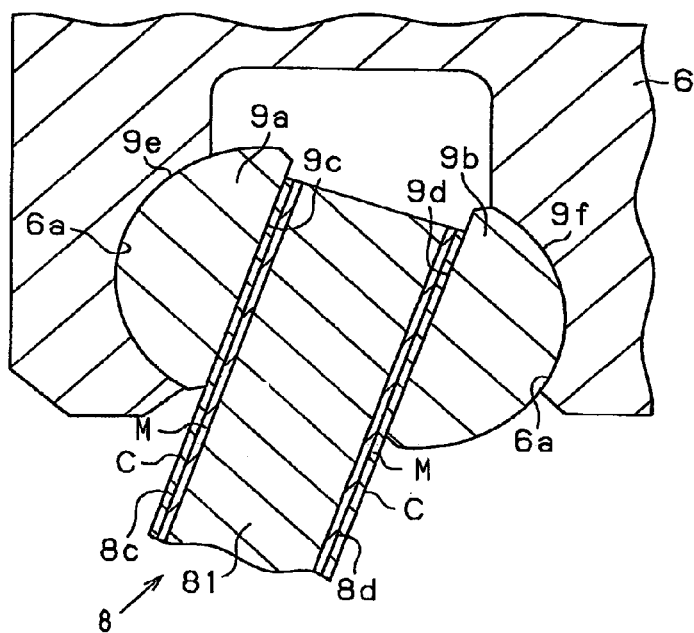
FIG. 17 is a cross-sectional view of a swash plate and shoes according to a second and a third embodiments of the present invention, illustrating sliding surfaces of the shoes and the swash plate.
Figure 18:
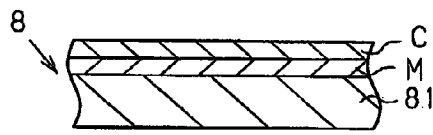
FIG. 18 is a partial cross-sectional view illustrating a swash plate according to the second and the third embodiments of the present invention.

To confirm the effects of the compressor of the embodiment shown in FIGS. 17 and 18, the following test (ii) was performed. First, the swash plate 8 of the comparison example 1 was prepared. The swash plate 8 of the comparison example 1 was obtained by subjecting the surface of a swash plate that is the same as the swash plate used in the embodiment of FIGS. 17 and 18 to a polishing process of 3 μm of roughness, and forming the sliding films C of the test article I or II. The swash plate 8 of the comparison example 1 is assembled in the compressor of FIG. 1.

The swash plate 8 of the comparison example 2 was obtained by subjecting the surfaces of a swash plate that is the same as the swash plate used in the embodiment of FIGS. 17 and 18 to electroless plating to form a tin plating layer whose thickness is 3 μm. The swash plate 8 of the comparison example 2 is also assembled in the compressor of FIG. 2.

The compressors having the swash plates 8 shown in FIGS. 17 and 18 and the compressors having the swash plates 8 of the comparison examples 1, 2 were operated for 100 hours at 700 rotations per minute with a poor lubrication. At this time, a force of 3.5 MPa was applied to the swash plates 8 of the embodiments of FIGS. 17 and 18 and the comparison examples 1, 2 through the shoes 9a, 9b. The shoes 9a, 9b are made of SUJ2. Under these conditions, the sliding films C of the swash plates 8 of the comparison examples were peeled off, while the sliding films C of the swash plates 8 of the FIGS. 17 and 18 were not peeled off.

(Test (iii))

Further, to confirm the effects of the compressors having the swash plates 8 of FIGS. 17, 18, the following test (iii) was performed. In this case, 15% of the surface of the sliding film C was exposed in a sector on the swash plates 8 of the embodiments of FIGS. 17, 18 and the swash plates of the comparison examples 1, 2. Then, under the same conditions as the embodiment of FIGS. 1 to 16, the test (iii) was performed. Under these sliding conditions, seizures occurred in fifty seconds in the swash plate 101 and the shoes 102 of the comparison example 1. In contrast to this, seizures did not occur until 150 seconds passed in the swash plate 101 having the middle layer M made of anodized aluminum and the shoes 102. Seizures did not occur until 140 seconds passed in the swash plate 101 having the middle layer M made of an etched layer and the shoes 102. Seizures did not occur until 300 seconds passed in the swash plate 101 and the shoes 102 of the comparison example 2.

As obvious from the tests (ii) and (iii), the sliding film C having the middle layer M made of anodized aluminum or an etched layer has a superior close contacting performance. Also, even if part of the sliding film C is lost, the sliding film C has a superior durability. This is because the middle layer M made of anodized aluminum or an etched layer has a great surface area due to minute pores, and PAI resin deeply enters pores and bonded with the middle layer M in a large area.

(Test (iv))

Further, to confirm the effects of the compressors having the swash plates 8 of the second embodiment, the following test (iv) was performed. First, the swash plate 8 of the comparison example 3 was prepared. The swash plate 8 of the comparison example 3 was formed by forming the sliding films C of the comparison examples (having substantially the same number of imide groups as that of the amide groups) on the swash plate 8 having a middle layer M made of anodized aluminum. The thickness of the middle layers M made of anodized aluminum was varied in the compressor having the swash plate 8 according to the second embodiment and the compressor having the swash plate 8 according to the comparison example 3. Under the same conditions as the test (i), seizure tests were performed for the second embodiment and the comparison examples 1, 3.

Figure 19:
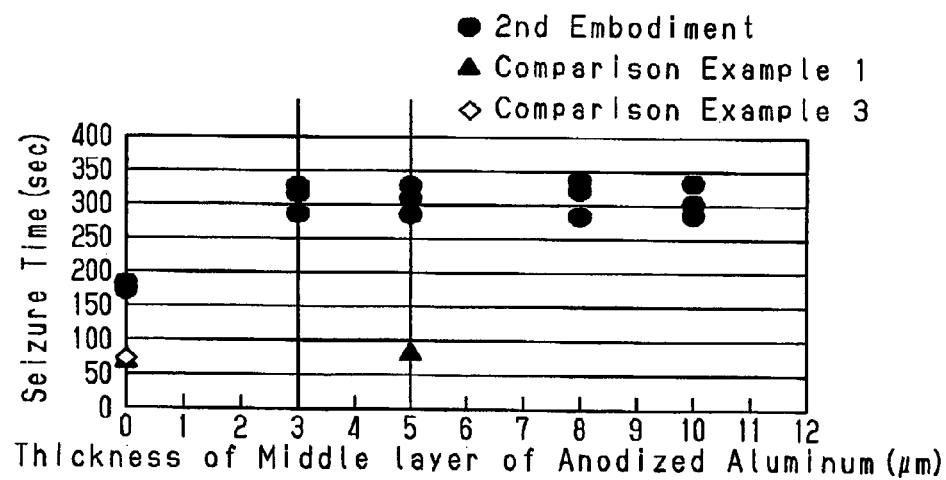
FIG. 19 is a graph showing the relationship between the thickness of a middle layer made of anodized aluminum and the seizure time.

As shown in FIG. 19, under the sliding conditions of the test (iv), the swash plate 101 of the comparison example 1 and the shoes 102 seized up in a short time as the test (iii). On the other hand, since having a middle layer M made of anodized aluminum, the swash plate 101 and the shoes 102 of the comparison example 3 had an improved seizure resistance compared to the comparison example 1. However, the swash plate 101 and the shoes 102 according to the second embodiment had a significantly better seizure resistance than the swash plate 101 of the comparison example 3. This is because the swash plate 101 and the shoes 102 of the second embodiment used the sliding films C made of the PAI resin of the test article I, which had a high glass transition temperature, a high tensile strength, and more amide groups than imide groups.

As shown in FIG. 19, when the thickness of the middle layer M made of anodized aluminum was no less than 3 μm, rough surface due to adhesion was unlikely to be caused. Particularly, if the thickness of the middle layer M made of anodized aluminum is in a range no less than 5 μm and no more than 15 μm, the rough surface due to adhesion is substantially completely prevented, and the formation of the middle layer M is facilitated.

The fourth embodiment will now be described with reference to FIG. 20.

Figure 20:
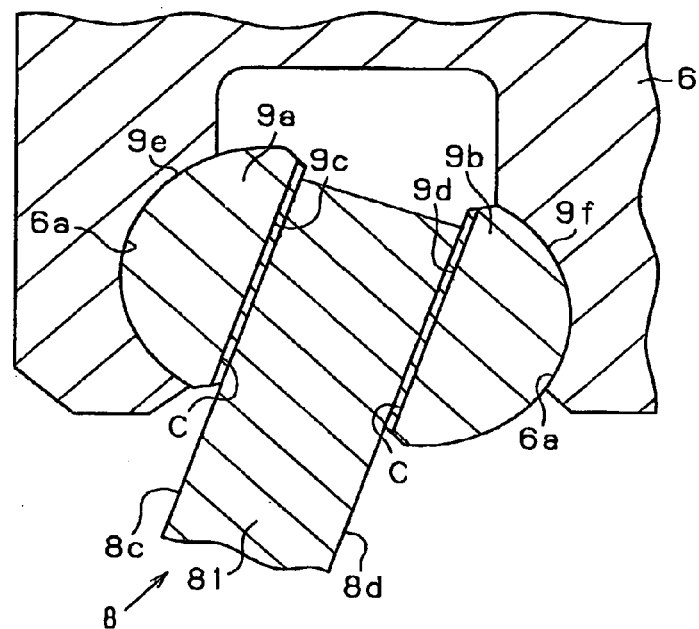
FIG. 20 is a cross-sectional view of shoes and a piston according to a fourth embodiment of the present invention, illustrating sliding surfaces of the shoes and the piston.

As shown in FIG. 20, the sliding films C are not formed on the surfaces 8c, 8d of the swash plate 8. Instead, the sliding films C of the test article I or II are formed on the flat surfaces 9c, 9d of the shoes 9a, 9b. The other structures are the same as the embodiment of FIG. 1 to 16. This embodiment has the same advantages as the embodiment shown in FIGS. 1 to 16.

The fifth embodiment will now be described with reference to FIG. 21.

Figure 21:
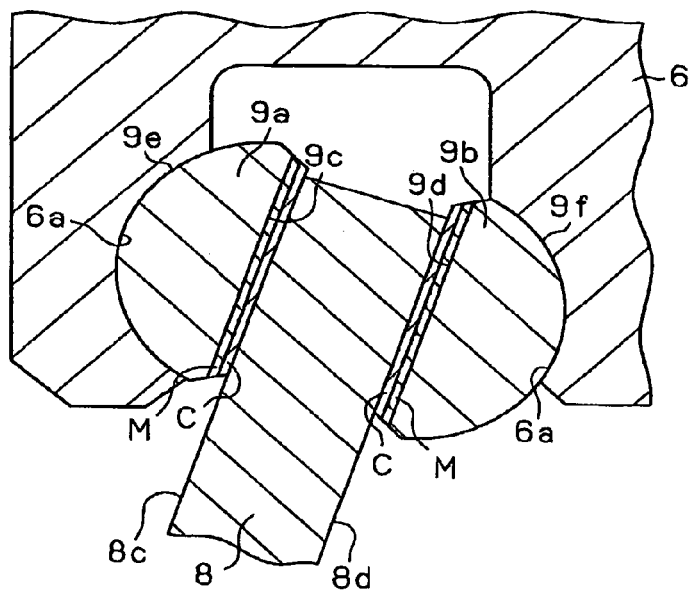
FIG. 21 is a cross-sectional view of shoes and a piston according to a fifth embodiment of the present invention, illustrating sliding surfaces of the shoes and the piston.

As shown in FIG. 21, the middle layers M and the sliding films C are not formed on the surfaces 8c, 8d of the swash plate 8. The main portion of each shoe 9a, 9b is made of an aluminum based alloy. The middle layer M of the second or third embodiment shown in FIGS. 17 and 18 and the sliding film C of the test article I or II are formed on the flat surface 9c, 9d of the main portion. The other structures are the same as the embodiment of FIG. 1 to 16. This embodiment has the same advantages as the embodiment shown in FIGS. 1 to 16.

The sixth embodiment will now be described with reference to FIG. 22.

Figure 22:
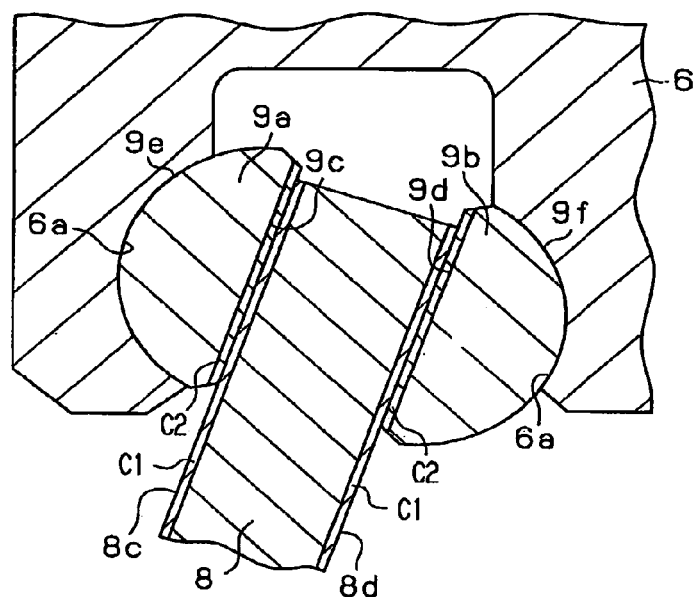
FIG. 22 is a cross-sectional view of shoes and a piston according to a sixth embodiment of the present invention, illustrating sliding surfaces of the shoes and the piston.

As shown in FIG. 22, the sliding films C of the test swash plate 8. Also, sliding films C2 of the test article I or II are formed on the flat surfaces 9c, 9d of the shoes 9a, 9b. The other structures are the same as the embodiment of FIG. 1 to 16. This embodiment has the same advantages as the embodiment shown in FIGS. 1 to 16.

Figure 23:
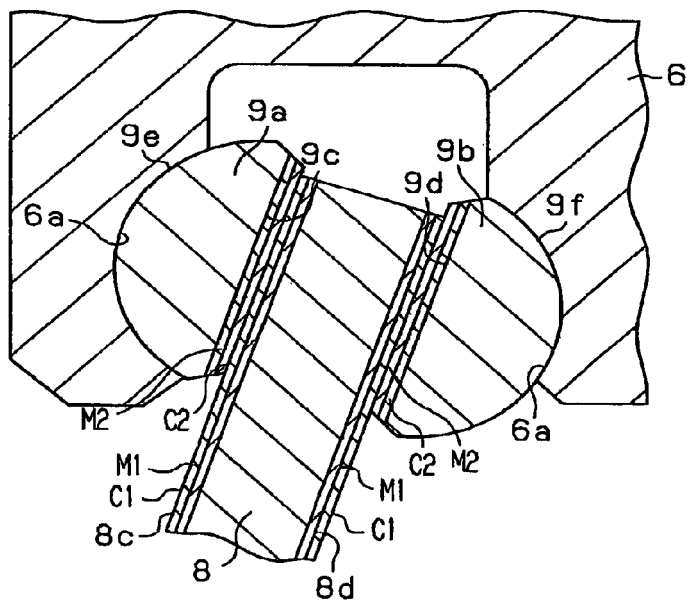
FIG. 23 is a cross-sectional view of shoes and a piston according to a seventh embodiment of the present invention, illustrating sliding surfaces of the shoes and the piston.

The seventh embodiment will now be described with reference to FIG. 23.

The main portion of the swash plate 8 is made of an aluminum-based metal. As shown in FIG. 23, a middle layer M1 and a sliding film C1 of the test article I or II are formed on each of the surfaces 8c, 8d of the base portion. The main portion of each shoe 9a, 9b is made of an aluminum-based metal. A middle layer M2 of the second or third embodiment and a sliding film C2 made of the test article I or II are formed on each of the flat surfaces 9c, 9d of the main portions. The other structures are the same as the embodiment of FIG. 1 to 16. This embodiment has the same advantages as the embodiments shown in FIGS. 1 to 18.

An eight embodiment of the present invention will now be described with reference to FIGS. 24 and 25.

Figure 24:
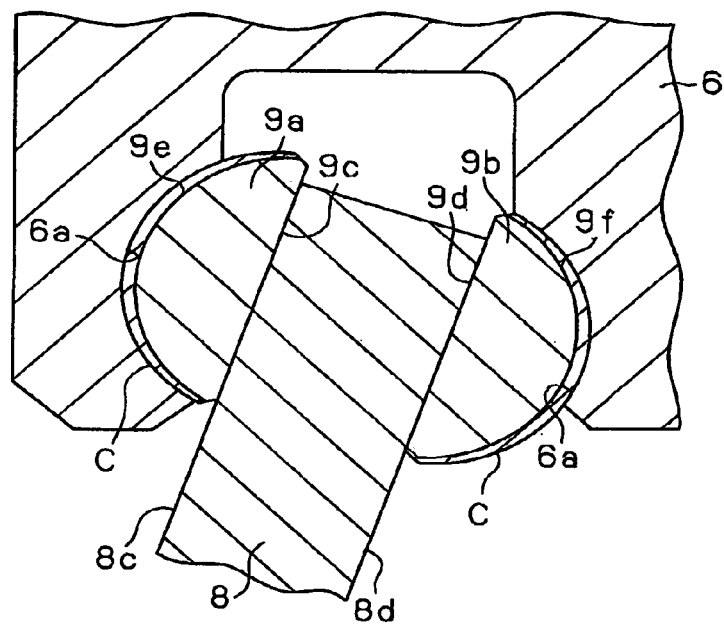
FIG. 24 is a cross-sectional view of shoes and a piston according to an eighth embodiment of the present invention, illustrating sliding surfaces of the shoes and the piston.
Figure 25:
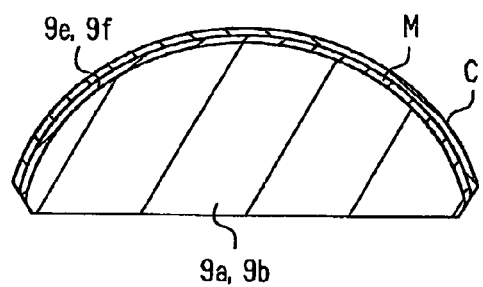
FIG. 25 is an enlarged cross-sectional view illustrating a modification of the shoes of FIG. 24.

As shown in FIG. 24, a sliding film C made of the test article I or II is formed on each of the hemispherical surface 9e, 9f of the shoes 9a, 9b. As shown in FIG. 25, a sliding film C is preferably formed on each of the hemispherical surface 9e, 9f of the shoes 9a, 9b with a middle layer M of the second or third embodiment in between. The other structures are the same as the embodiments of FIG. 1 to 18.

Since the sliding films C permit the contacting member to smoothly slide, rattles of the shoes 9a, 9b and the pistons 6 by wear of at least one of them or failures resulting from seizure therebetween are more effectively prevented than in the conventional compressor. Further, since the hemispherical surfaces 9e, 9f of the shoes 9a, 9b smoothly slide on concave surfaces 6a of the piston 6, the flat surface 9c, 9d of the shoes 9a, 9b reliably follow the movement of the surfaces 8c, 8d of the swash plate 8. Thus, rattles of the swash plate 8 and the shoes 9a, 9b by wear of at least one of them or failures resulting from seizure therebetween are more effectively prevented than in the conventional compressor. The other advantages are the same as the embodiments of FIGS. 1 to 18.

Instead of forming the sliding films C on the hemispherical surfaces 9e, 9f of the shoes 9a, 9b, a sliding film may be formed on the concave surfaces 6a of the pistons 6. At this time, the sliding film is preferably formed on the concave surfaces 6a of the piston 6 with the middle layer M of the second or third embodiment in between.

Sliding films may be formed both on the hemispherical surfaces 9e, 9f of the shoes 9a, 9b and the concave surfaces 6a of the piston 6. At this time, the sliding film is preferably formed on the hemispherical surface 9e, 9f of the shoes 9a, 9b and the concave surfaces 6a of the piston 6 with the middle layer M of the second or third embodiment in between.

A ninth embodiment of the present invention will now be described with reference to FIGS. 26 and 27.

Figure 26:
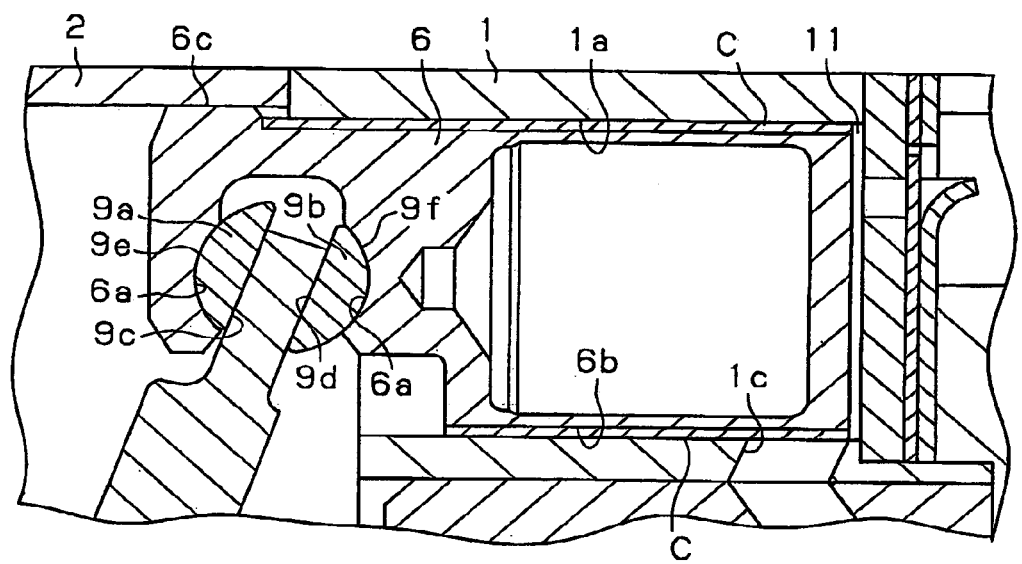
FIG. 26 is a cross-sectional view of a piston and a housing according to a ninth embodiment of the present invention, illustrating sliding surfaces of the piston and the housing.
Figure 27:
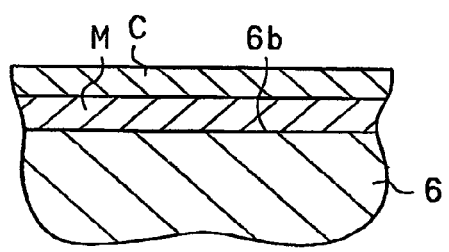
FIG. 27 is a partial cross-sectional view illustrating a modification of the piston of FIG. 26.

As shown in FIG. 26, a sliding film C made of the test article I or II is formed on a circumferential surface 6b of the piston 6. As shown in FIG. 27, the sliding film C is preferably formed on the circumferential surface 6b of the piston 6 with the middle layer M of the second or third embodiment shown in FIGS. 17 and 18, in between. The other structures are the same as the embodiments of FIG. 1 to 18.

Since the sliding films C permit the contacting member to smoothly slide, rattles of the piston 6 and the cylinder block 1 by wear of at least one of them or failures resulting from seizure therebetween are more effectively prevented than in the conventional compressor. The other advantages are the same as the embodiments of FIGS. 1 to 18.

Instead of forming the sliding films C on the circumferential surface 6b of the piston 6, a sliding film C may be formed on the inner circumferential surface of the cylinder bore 1a of the cylinder block 1. At this time, the sliding film is preferably formed on the inner circumferential surface of the cylinder bore 1a with the middle layer M of the second or third embodiment in between.

Sliding films may be formed both on the circumferential surface 6b of the piston 6 and the inner circumferential surface of the cylinder bore 1a. At this time, the sliding film is preferably formed on the circumferential surface 6b of the piston 6 and the inner circumferential surface of the cylinder bore 1a with the middle layer M of the second or third embodiment in between.

A tenth embodiment of the present invention will now be described with reference to FIGS. 28 and 29.

Figure 28:
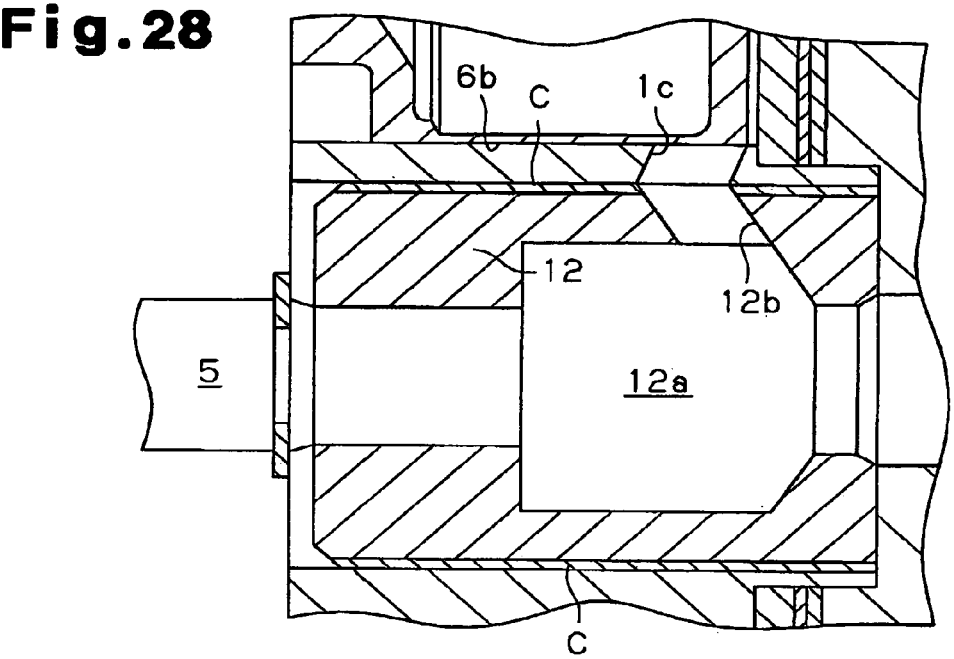
FIG. 28 is a cross-sectional view of a rotary valve and a housing according to a tenth embodiment of the present invention, illustrating sliding surfaces of the rotary valve and the housing.
Figure 29:
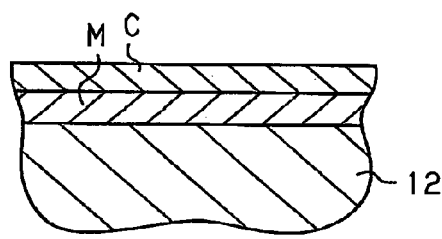
FIG. 29 is a partial cross-sectional view illustrating a modification of the rotary valve of FIG. 28.

As shown in FIG. 28, a sliding film C made of the test article I or II is formed on a circumferential surface of the rotary valve 12. At this time, the sliding film is preferably formed on the circumferential surface of the rotary valve 12 with the middle layer M of the second or third embodiment in between. The other structures are the same as the embodiments of FIG. 1 to 18.

Since the sliding film C permits the contacting member to smoothly slide, rattles of the cylinder block 1 and the rotary valve 12 by wear of at least one of them or failures resulting from seizure therebetween are more effectively prevented than in the conventional compressor. The other advantages are the same as the embodiments of FIGS. 1 to 18.

Instead of forming the sliding film C on the circumferential surface of the rotary valve 12, a sliding film may be formed on the inner circumferential surface of the rotary valve chamber 1b of the cylinder block 1. At this time, the sliding film is preferably formed on the inner circumferential surface of the rotary valve chamber 1b with the middle layer M of the second or third embodiment in between.

Sliding films may be formed both on the circumferential surface of the rotary valve 12 and the inner circumferential surface of the rotary valve chamber 1b. At this time, the sliding film is preferably formed on the circumferential surface of the rotary valve 12 and the inner circumferential surface of the rotary valve chamber 1b with the middle layer M of the second or third embodiment in between.

An eleventh embodiment will now be described using FIG. 1.

In this embodiment, the radial bearing 2b shown in FIG. 1 is not used, and a sliding film C made of the test article I or II is formed on at least one of the inner circumferential surface of the shaft hole of the front housing member 2 and the circumferential surface of the drive shaft 5. The drive shaft 5 is slidably and rotatably supported by the front housing member 2. At this time, the sliding film is preferably formed on at least one of the inner circumferential surface of the shaft hole of the front housing member 2 and the circumferential surface of the drive shaft 5 with the middle layer M of the second or third embodiment in between. The other structures are the same as the embodiments of FIG. 1 to 18. This embodiment has the same advantages as the embodiments shown in FIGS. 1 to 18.

A twelfth embodiment will now be described using FIG. 1.

In this embodiment, the thrust bearing 2c shown in FIG. 1 is not used, and a sliding film C made of the test article I or II is formed on at least one of the inner rear end of the front housing member 2 and the front end face of the lug plate 7. The lug plate 7 is slidably and rotatably supported by the front housing member 2. At this time, the sliding film is preferably formed on at least one of the inner rear end face of the front housing member 2 and the front end face of the lug plate 7 with the middle layer M of the second or third embodiment in between. The other structures are the same as the embodiments of FIG. 1 to 18. This embodiment has the same advantages as the embodiments shown in FIGS. 1 to 18.

A thirteenth embodiment will now be described using FIG. 1.

In this embodiment, a sliding film C made of the test article I or II is formed on at least one of the inner circumferential surface of the through hole 8a of the swash plate 8 and the circumferential surface of the drive shaft 5, so that the swash plate 8 and the drive shaft 5 smoothly slide on each other. At this time, the sliding film is preferably formed on at least one of the inner circumferential surface of the through hole 8a of the swash plate 8 and the circumferential surface of the drive shaft 5 with the middle layer M of the second or third embodiment in between. The other structures are the same as the embodiments of FIG. 1 to 18.

This embodiment has the same advantages as the embodiments shown in FIGS. 1 to 18.

A fourteenth embodiment will now be described using FIG. 1.

In this embodiment, a sliding film C made of the test article I or II is formed on at least one of the inner circumferential surface of the guide hole 7b of the lug plate 7 and the outer surface of the spherical portion of the guide pin 8b, so that the guide pins 8b and the guide hole 7b smoothly slide on each other. At this time, the sliding film is preferably formed on at least one of the inner circumferential surface of the guide hole 7b of the lug plate 7 and the surface of the spherical portion of the guide pin 8b with the middle layer M of the second or third embodiment in between. The other structures are the same as the embodiments of FIG. 1 to 18. This embodiment has the same advantages as the embodiments shown in FIGS. 1 to 18.

A fifteenth embodiment will now be described using FIG. 1.

In this embodiment, the sliding film C made of the test article I or II is formed on at least one of the rear end face 12c of the rotary valve 12 and the front end face 4c of the rear housing member 4. The front end face 4c is a part of the housing that slides on the rear end face 12c. The rear end face 12c of the rotary valve 12 smoothly slides on the front end face 4c of the rear housing member 4, or the housing. At this time, the sliding film is preferably formed on at least one of the rear end face 12c of the rotary valve 12 and the front end face 4c of the rear housing member 4 with the middle layer M of the second or third embodiment in between. The other structures are the same as the embodiments of FIG. 1 to 18. This embodiment has the same advantages as the embodiments shown in FIGS. 1 to 18.

A sixteenth embodiment according to the present invention will now be described with reference to FIGS. 30 to 32.

Figure 30:
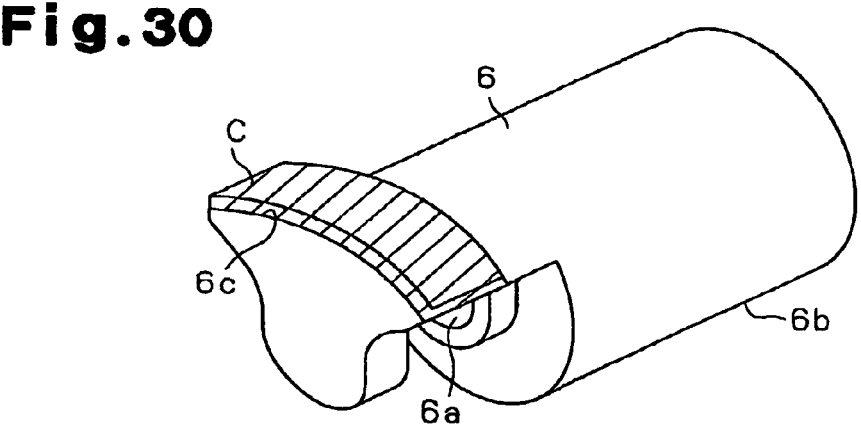
FIG. 30 is a perspective view illustrating a piston according to a sixteenth embodiment of the present invention.
Figure 31:
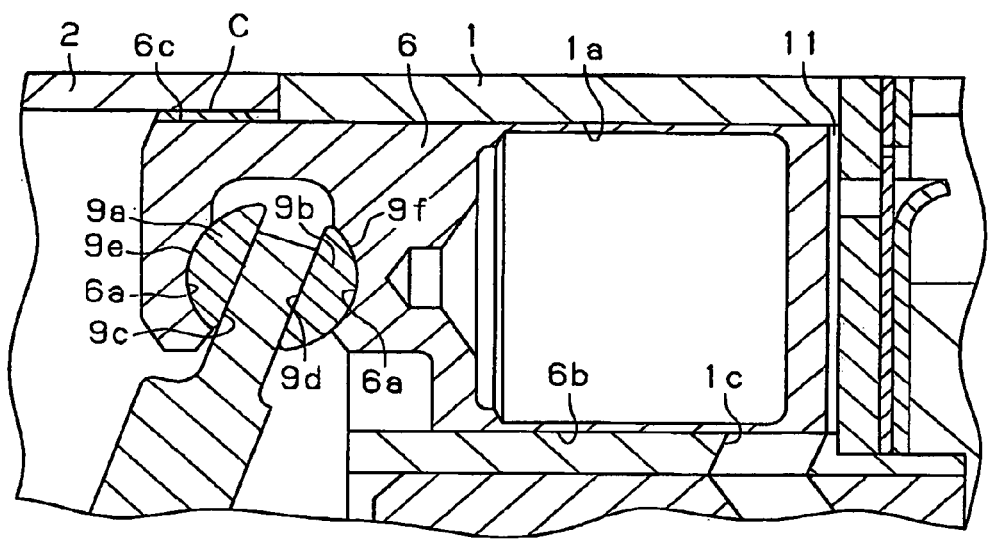
FIG. 31 is a cross-sectional view illustrating sliding surfaces of a rotation restrictor of the piston shown in FIG. 30 and a housing.
Figure 32:
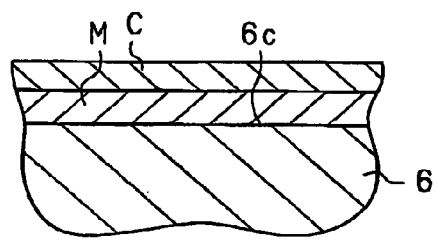
FIG. 32 is a partial cross-sectional view illustrating a modification of the piston of FIG. 30.

As shown in FIGS. 30 and 31, the piston 6 has a rotation restrictor 6c for preventing the piston 6 from being rotated by rotation of the swash plate 8. The rotation restrictor 6c slides on the inner circumferential surface of the front housing member 2 as the piston 6 reciprocates. A sliding film C made of the test article I or II is formed on at least one of the rotation restrictor 6c of the piston 6 and the inner circumferential surface of the front housing member 2. This structure permits the rotation restrictor 6c of the piston 6 to smoothly slide on the inner circumferential surface of the front housing member 2, or on the housing. In this construction, the sliding film C is preferably formed at least one of the rotation restrictor 6c of the piston 6 and the inner circumferential surface of the front housing member 2 with the middle layer M of the second or third embodiment in between as shown in FIG. 32. This embodiment has the same advantages as the embodiments shown in FIGS. 1 to 18.

A seventeenth embodiment according to the present invention will now be described with reference to FIGS. 33 to 35.

Figure 33:
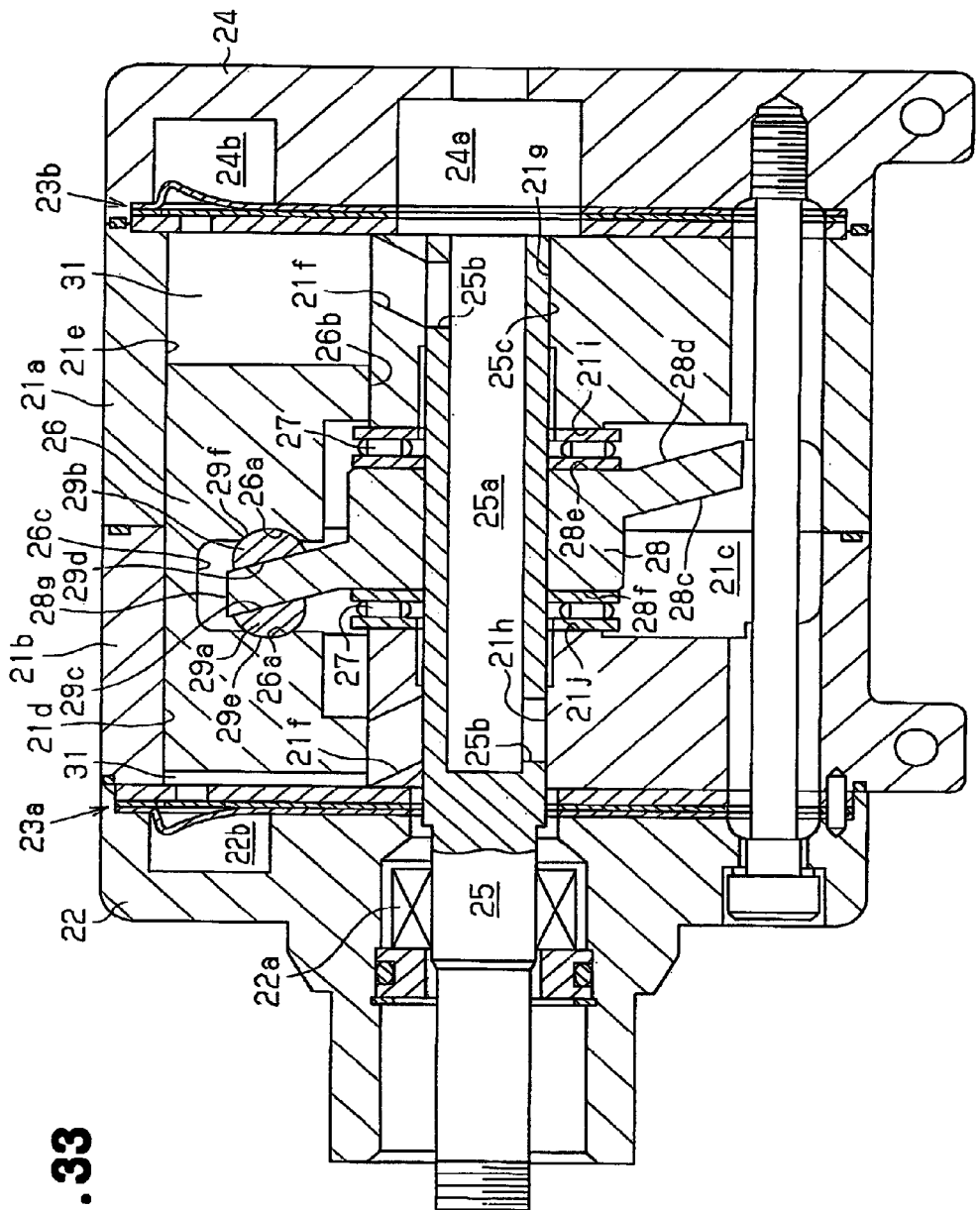
FIG. 33 is a cross-sectional view illustrating a compressor according to a seventeenth embodiment of the present invention.

FIG. 33 shows a fixed displacement swash plate type compressor having double-headed pistons 26. The compressor includes a pair of cylinder blocks 21a, 21b made of an aluminum-based alloy, a front housing member 22, and a rear housing member 24. The housing members 22, 24 are made of an aluminum-based alloy. The front housing member 22 is secured to the front end face of the cylinder blocks 21a, 21b with a first valve mechanism 23a in between. The first valve mechanism 23a includes a valve plate, a discharge valve, and a retainer. The rear housing member 24 is secured to the rear end face of the cylinder blocks 21a, 21b with a second valve mechanism 23b. The second valve mechanism 23b includes a valve plate, a discharge valve, and a retainer. A discharge chamber 22b is defined in the front housing member 22. A suction chamber 24a and a discharge chamber 24b are defined in the rear housing member 24. In this embodiment, the cylinder blocks 21a, 21b, the front housing member 22, and the rear housing member 24 form the housing of the compressor. The discharge chambers 22b, 24b are connected to a single discharge chamber (not shown). The suction chamber 24a is connected to an evaporator (not shown). The evaporator is connected to a condenser (not shown) through an expansion valve (not shown). The condenser is connected to the single discharge chamber.

A drive shaft 25 made of an iron-based alloy is slidably and rotatably supported by the cylinder blocks 21a, 21b. A sealing member 22a is provided between the drive shaft 25 and the front housing member 22. Cylinder bores 21d, 21e that are parallel to the drive shaft 25 are defined in the cylinder blocks 21a, 21b. Each pair of the cylinder bores 21d, 21e accommodates one of the double-headed pistons 26, which are made of an aluminum-based alloy. A compression chamber 31 is defined between each head of each piston 26 and the corresponding one of the cylinder bores 21d, 21e.

An introduction chamber 25a communicating with the suction chamber 24a is defined in the drive shaft 25. Suction guide grooves 25b radially extend from the introduction chamber 25a. In each cylinder block 21a, 21b, a suction passage 21f is defined for connecting each cylinder bore 21d, 21e with the introduction chamber 25a through the corresponding suction guide groove 25b.

A swash plate chamber 21c is defined between the cylinder blocks 21a, 21b. A swash plate 28 made of an aluminum-based alloy is fixed to the drive shaft 25 and is located in the swash plate chamber 21c. Pairs of hemispherical shoes 29a, 29b made of an aluminum-based alloy are engaged with the swash plate 28. Each piston 26 is coupled to the peripheral portion of the swash plate 28 by the corresponding pair of shoes 29a, 29b. A pair of thrust bearings 27 are located between the end faces of the swash plate 28 and the inner surfaces of the cylinder blocks 21a, 21b, respectively. The swash plate 28 is held between the cylinder blocks 21a, 21b with the thrust bearings 27.

Figure 34:
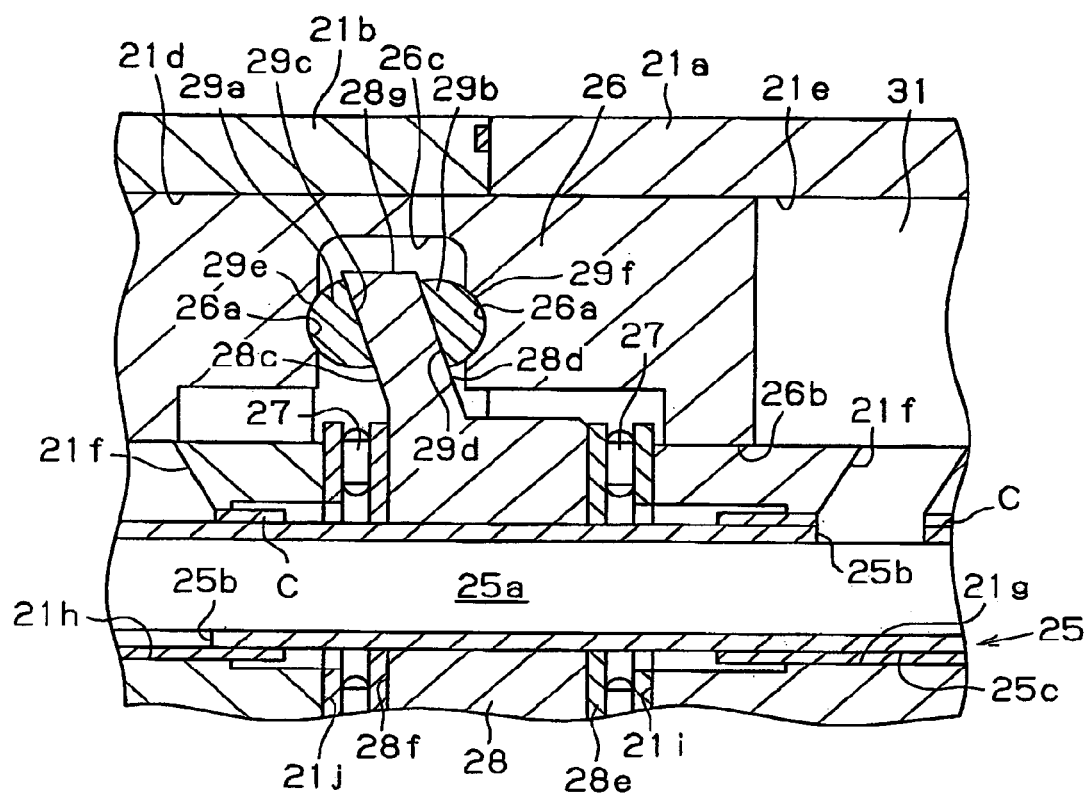
FIG. 34 is a cross-sectional view illustrating sliding surfaces of a drive shaft of a compressor shown in FIG. 33 and a housing.

As shown in FIG. 34, a sliding film C is formed on the outer circumferential surface 25c of the drive shaft 25, which slides on the cylinder blocks 21a, 21b. The sliding film C is formed in the following manner.

First, as in the embodiment of FIGS. 1 to 16, a sliding member coating composition of the test article I, and the drive shaft 25, which is made of an iron-based alloy and has been degreased are prepared. The coating composition is applied to the outer circumferential surface 25c of the drive shaft 25. The coating composition is transferred onto the drive shaft 25 through roll coating. The drive shaft 25 is then heated at 200° C. for sixty minutes under atmospheric conditions, thereby hardening unhardened binder resin. In this manner, the drive shaft 25 that has the sliding film C formed of the binder resin containing the solid lubricant on the circumferential surface 25c is obtained. The solid lubricant is dispersed in the binder resin to form the sliding film C.

Figure 35:
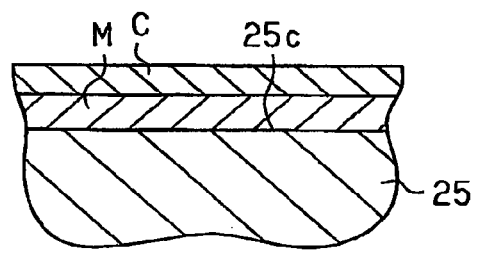
FIG. 35 is an enlarged cross-sectional view illustrating a modification of the drive shaft of FIG. 33.

As shown in FIG. 35, the sliding film C is preferably formed on the circumferential surface 25c of the drive shaft 25 with the middle layer M of the embodiment shown in FIG. 17 or FIG. 18, in between. The obtained drive shaft 25 is assembled in the compressor shown in FIG. 33.

The compressor thus constructed is mounted on a vehicle with its drive shaft 25 coupled to a pulley or an electromagnetic clutch (neither is shown). The pulley or the electromagnetic clutch is driven by an engine or an electric motor (neither is shown) with a belt (not shown). When the engine is operating, if the drive shaft 25 is rotated, the swash plate 28 wobbles. Accordingly, each piston 26 reciprocates in the associated pair of the cylinder bores 21d, 21e at a stroke corresponding to the inclination angle of the swash plate 28. When the drive shaft 25 is rotated, in accordance with reciprocation of each piston 26, the introduction chamber 25a is selectively connected to the associated compression chamber 31 through the suction guide groove 25b and the associated suction passage 21f. Therefore, when each piston 26 is moved from right to left as viewed in FIG. 33, the introduction chamber 25a is connected to the right compression chamber 31, so that refrigerant gas is supplied to the compression chamber 31 from the evaporator of the vehicle refrigeration circuit through the suction chamber 24a and the introduction chamber 25a. At this time, the left compression chamber 31 is disconnected from the introduction chamber 25a, and refrigerant gas is compressed in the left compression chamber 31. The gas is then discharged to the condenser through the discharge chamber 22b. When the piston 26 is moved from left to right as viewed in FIG. 33, the operations of the left and right compression chambers 31 are reversed.

During the series of processes, the solid lubricant in the sliding film C formed on the circumferential surface 25c of the drive shaft 25 provides seizure resistance to the drive shaft 25 and the inner circumferential surfaces 21g, 21h of the cylinder blocks 21a, 21b.

Therefore, under harsh environments, that is, even if the drive shaft 25 and the cylinder blocks 21a, 21b slide and rotate relative to each other at a high speed or under a relatively high load, the sliding film C permit the circumferential surface 25c of the drive shaft 25 to smoothly slide. Thus, rattles of the drive shaft 25 and the cylinder blocks 21a, 21b by wear of at least one of them or failures resulting from seizure therebetween are prevented. The compressor of this embodiment has a high reliability.

Instead forming the sliding film C on the circumferential surface 25c of the drive shaft 25, a sliding film of the test article I or II may be formed on the inner circumferential surface 21g, 21h of the cylinder blocks 21a, 21b. At this time, the sliding film is preferably formed on the inner circumferential surfaces 21g, 21h of the cylinder blocks 21a, 21b with a middle layer in between. As the middle layer, a quenched layer or a spayed layer made of an aluminum-based metal or a copper based metal may be used.

Alternatively, while forming the sliding film C1 of the test article I or II on the circumferential surface 25c of the drive shaft 25, a sliding film of the first or second embodiment may be formed on the inner circumferential surface 21g, 21h of the cylinder blocks 21a, 21b. At this time, the sliding film is preferably formed on the circumferential surface 25c of the drive shaft 25 and the inner circumferential surfaces 21g, 21h of the cylinder blocks 21a, 21b with a middle layer in between.

An eighteenth embodiment according to the present invention will now be described with reference to FIG. 36, while using FIGS. 33 to 35.

In this embodiment, a sliding film C made of the test article I or II is formed on at least one of the surfaces 28c, 28d of the swash plate 28 and the flat surfaces 29c, 29d of the shoes 29a, 29b. At this time, the sliding film is preferably formed on at least one of the surfaces 28c, 28d of the swash plate 28 and the flat surfaces 29c, 29d of the shoes 29a, 29b with the middle layer M of the second or third embodiment in between. The other structures are the same as the embodiments of FIGS. 33 to 35.

Since the sliding film C permits the contacting member to smoothly slide, rattles of the swash plate 28 and the shoes 29a, 29b by wear of at least one of them or failures resulting from seizure therebetween are more effectively prevented than in the conventional compressor. This embodiment has the same advantages as the embodiments shown in FIG. 1 to 16, FIGS. 17, 18 and FIGS. 33 to 35.

(Test (v))

The above effects were confirmed through the following test (v). Under the same conditions as the test (i), a swash plate 28 with a sliding film C formed by using sliding member coating composition of the test article I, and a swash plate of a comparison example 4 with a sliding film C formed of a sliding member coating composition (having the same number of imide groups with that of amide groups) of a comparison article were prepared. In this manner, a swash plate type compressor having the swash plate 28 of this embodiment, and a swash plate compressor according to the comparison example 4 were obtained. No lubricating oil was supplied to the swash plate chamber 21c of both compressors. The number of revolution was maintained to 3000 rpm. In this state, time (seconds) until seizure occurs between the swash plates and the shoes 29a, 29b was measured. The results are shown in FIG. 36.

Figure 36:
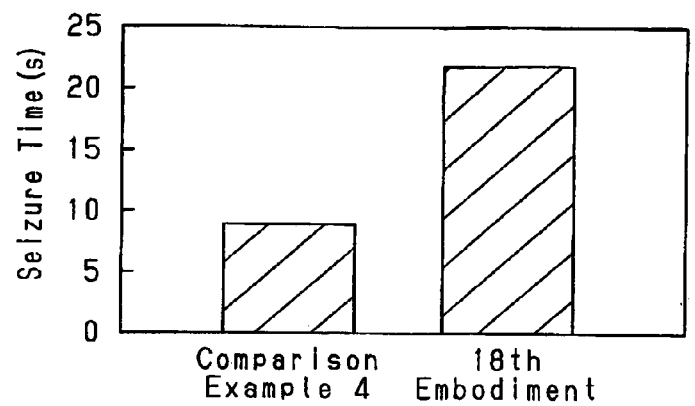
FIG. 36 is a graph showing the results of an eighteenth embodiment of the present invention and a comparison example 4.

FIG. 36 shows that seizure did not occur for a long time in the swash plate type compressor of this embodiment without lubrication, compared to the swash plate type compressor of the comparison example 4. The results show that the compressor using the sliding film C of the test article I exerts a superior durability.

A nineteenth embodiment will now be described using FIG. 33.

A sliding film of the test article I or II is formed on at least one of the hemispherical surface 29e, 29f of each shoe 29a, 29b and each concave surface 26a of each piston 26. At this time, the sliding film C is preferably formed on at least one of each hemispherical surface 29e, 29f of the shoes 29a, 29b and each concave surface 26a of the pistons 26 with the middle layer M of the second or third embodiment in between. The other structures are the same as the embodiments of FIGS. 33 to 35.

Since the sliding films C permit the contacting member to smoothly slide, rattles of the shoes 29a, 29b and the pistons 26 by wear of at least one of them or failures resulting from seizure therebetween are more effectively prevented than in the conventional compressor. Further, since the hemispherical surfaces 29e, 29f of the shoes 29a, 29b smoothly slide on concave surfaces 26a of the piston 26, the flat surface 29c, 29d of the shoes 29a, 29b reliably follow the movement of the surfaces 28c, 28d of the swash plate 28. Thus, rattles of the swash plate 28 and the shoes 29a, 29b by wear of at least one of them or failures resulting from seizure therebetween are more effectively prevented than in the conventional compressor. This embodiment has the same advantages as the embodiments shown in FIG. 1 to 16, FIGS. 17, 18 and FIGS. 33 to 35.

A twentieth embodiment will now be described using FIG. 33.

In this embodiment, a sliding film C made of the test article I or II is formed on at least one of the circumferential surface 26b of each piston 26 and the inner circumferential surfaces of the cylinder bores 21e, 21d of the cylinder blocks 21a, 21b. At this time, the sliding film is preferably formed on at least one of the circumferential surface 26b of each piston 26 and the inner circumferential surfaces of the cylinder bores 21e, 21d of the cylinder blocks 21a, 21b with the middle layer M of the second or third embodiment in between. The other structures are the same as the embodiments of FIGS. 33 to 35.

In this embodiment also, since the sliding films C permit the contacting member to smoothly slide, rattles of the piston 26 and the cylinder blocks 21a, 21b by wear of at least one of them or failures resulting from seizure therebetween are more effectively prevented than in the conventional compressor. This embodiment has the same advantages as the embodiments shown in FIG. 1 to 16, FIGS. 17, 18 and FIGS. 33 to 35.

A twenty-first embodiment will now be described using FIG. 33.

In this embodiment, the thrust bearings 27 shown in FIG. 33 are omitted, and a sliding film C made of the test article I or II is formed on at least one of the end surfaces 28e, 28f of the swash plate 28 and wall surfaces 21i, 21j defining the swash plate chamber 21c, such that the swash plate 28 is slidably and rotatably supported by the wall surfaces 21i, 21j of the cylinder blocks 21a, 21b. At this time, the sliding film C is preferably formed on at least one of each end surfaces 28e, 28f of the swash plate 28 and each wall surface 21i, 21j with the middle layer M of the second or third embodiment in between. The other structures are the same as the embodiments of FIGS. 33 to 35.

Since the sliding film C permits the contacting member to smoothly slide, rattles of the swash plate 28 and the cylinder blocks 21a, 21b by wear of at least one of them or failures resulting from seizure therebetween are more effectively prevented than in the conventional compressor. This embodiment has the same advantages as the embodiments shown in FIG. 1 to 16, FIGS. 17, 18 and FIGS. 33 to 35.

A twenty-second embodiment according to the present invention will now be described with reference to FIGS. 37 to 39.

Figure 37:
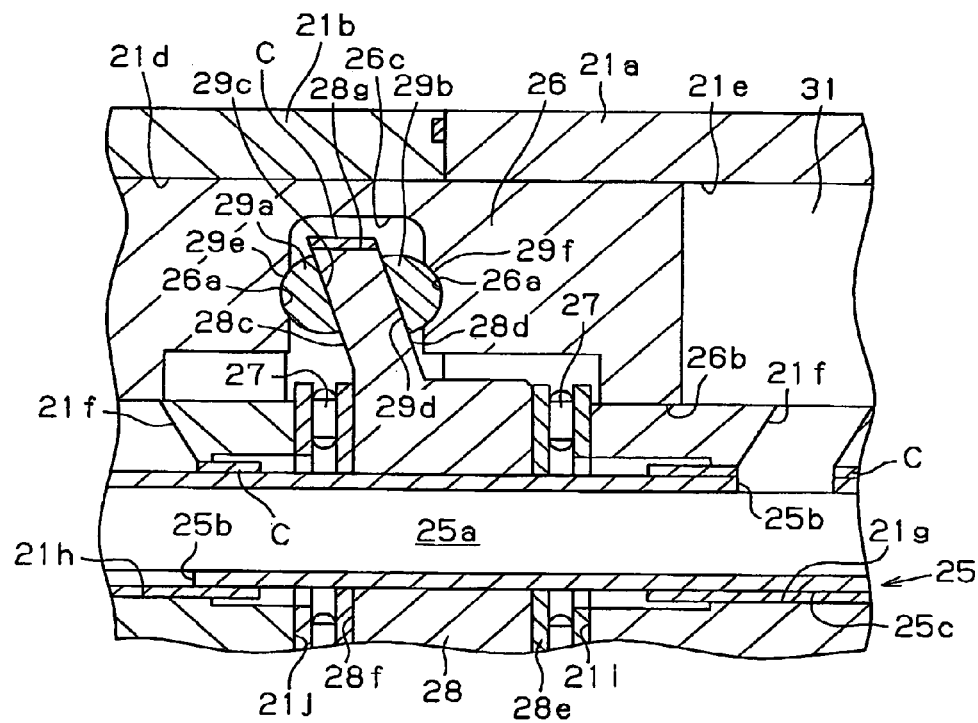
FIG. 37 is a cross-sectional view of a piston and a swash plate according to a twenty-second embodiment of the present invention, illustrating sliding surfaces of the piston and the swash plate.
Figure 38:
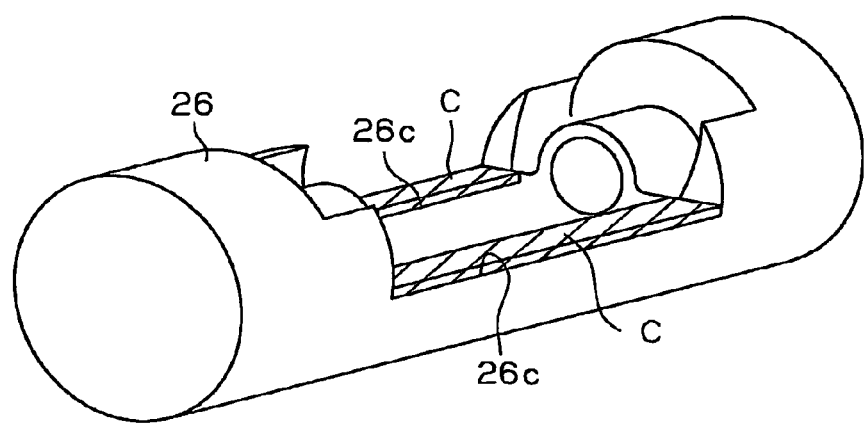
FIG. 38 is a perspective view illustrating a piston incorporated in the compressor shown in FIG. 37.
Figure 39:
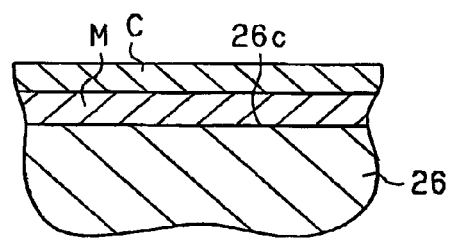
FIG. 39 is a partial cross-sectional view illustrating a modification of the piston of FIG. 37.

As shown in FIGS. 37 and 38, a sliding film C made of the test article I or II is formed on at least one of a rotation restrictors 26c of the piston 26 and the circumferential surface 28g of the swash plate 28. As shown in FIG. 39, the sliding film C is preferably formed at least one of the rotation restrictors 26c of the piston 26 and the circumferential surface 28g of the swash plate 28 with the middle layer M of the second or third embodiment in between. The other structures are the same as the embodiments of FIGS. 33 to 35.

Since the sliding films C permit the contacting member to smoothly slide, rattles of the rotation restrictors 26c of the piston 26 and the circumferential surface 28g of the swash plate 28 by wear of at least one of them or failures resulting from seizure therebetween are more effectively prevented than in the conventional compressor. This embodiment has the same advantages as the embodiments shown in FIG. 1 to 16, FIGS. 17, 18 and FIGS. 33 to 35.

The above described embodiments may be modified as follows.

The binder resin, which is a PAI resin, in the sliding films C according to the present invention may contain, other than the solid lubricant, a friction modifier, a pressure reducing agent, a surface active agent, and a film forming assisting agent. As the friction modifier, powder of oxidized metal such as $CrO_2$, $Fe_2O_3$, $Fe_3O_4$, PbO, ZnO, CdO, $Al_2O_3$, $SiO_2$, $TiO_2$, $SnO_2$, and inorganic powder of substances such as SiC and $Si_3N_4$ may be used. The added friction modifier is assumed to bear loads acting between a first member and second member, thereby improving the sliding property of sliding films. As the depressurizing agent, the following substances may be used: powder of sulfide such as ZnS, $Ag_2S$, CuS, FeS, $FeS_2$, $Sb_3S_2$, PbS, $Bi_2S_3$, CdS; a sulfur compound such as thirams, morpholine, disulfide, dithioate, sulfides, sulfoxides, sulfonic acids, thiophosphinates, thiocarbonate, alkylthiocarbamoyls, and olefin sulfide; halogen compound such as chlorinated hydrocarbon; organic metal compounds such as zinc thiophosphate (zinc dithiophosphate, for example) and thiocarbamic acid, and organic molybdenum compound such as molybdenum dithiophosphate and molybdenum dithiocarbamate. The added depressurizing agent is expected to strongly retain lubricant oil, and improves the sliding property of sliding films under insufficient lubrication where there is occasional contact of solid bodies and when load applied to sliding members is uneven. A coupling agent may be used as the surface active agent. The added coupling agent is thought to cause the solid lubricant to be strongly coupled to the binder resin, and cause the sliding film to at least one of the first and second members. As the film formation aiding agent, an epoxy resin, a silane coupling agent, a titanate coupling agent.

The invention claimed is:

1. A compressor, comprising:
   a first member having a first sliding surface;
   a second member having a second sliding surface, wherein one of the first and second sliding surfaces slides on the other; and
   a sliding film formed on at least one of the first and second sliding surfaces, the sliding film being formed of a polyamide-imide resin containing solid lubricant, wherein the tensile strength of the polyamide-imide resin at room temperature is no less than 200 MPa, wherein an isocyanate component is a starting material for the polyamide-imide resin, and the isocyanate component contains 5% to 90% by mol of 3.3'-dimethylbiphenyl-4,4'-diisocyanate, and wherein the number average molecular weight of the polyamide-imide resin is no less than 20,000.

2. The compressor according to claim 1, wherein the glass transition temperature of the polyamide-imide resin is no less than 270° C.

3. The compressor according to claim 1, wherein the polyamide-imide resin contains more imide groups than amide groups.

4. The compressor according to claim 1, wherein the tensile strength of the polyamide-imide resin at room temperature is no more than 249 MPa.

5. The compressor according to claim 1, wherein the glass transition temperature of the polyamide-imide resin is no less than 290° C.

6. The compressor according to claim 1, wherein the solid lubricant contains polytetrafluoroethylene.

7. The compressor according to claim 1, further comprising:
   a housing in which a suction chamber, a discharge chamber, and a cylinder bore are defined;
   a drive shaft, which is rotatably supported by the housing;
   a piston housed in the cylinder bore, wherein the piston reciprocates in the cylinder bore and defines a compression chamber in the cylinder bore; and
   a swash plate, wherein the swash plate is coupled to the piston with a shoe such that rotation of the drive shaft is converted into reciprocation of the piston, wherein the first member includes the shoe, and the second member includes at least one of the swash plate and the piston.

8. The compressor according to claim 7, wherein at least one of the swash plate, the piston and the shoe is made of an aluminum-based metal, and wherein the sliding film is formed on the aluminum-based metal with a middle layer made of anodized aluminum in between.

9. The compressor according to claim 1, further comprising:
- a housing in which a suction chamber, a discharge chamber, and a cylinder bore are defined;
- a drive shaft, which is rotatably supported by the housing;
- a piston housed in the cylinder bore, wherein the piston reciprocates in the cylinder bore and defines a compression chamber in the cylinder bore; and
- a swash plate, wherein the swash plate is coupled to the piston with a shoe such that rotation of the drive shaft is converted into reciprocation of the piston,
- wherein the first member includes the housing, and the second member includes at least one of the piston and the drive shaft.

10. The compressor according to claim 9, wherein at least one of the piston, the drive shaft and the housing is made of an aluminum-based metal, and wherein the sliding film is formed on the aluminum-based metal with a middle layer made of anodized aluminum in between.

11. The compressor according to claim 1, further comprising:
- a housing in which a suction chamber, a discharge chamber, and a cylinder bore are defined;
- a drive shaft, which is rotatably supported by the housing;
- a piston housed in the cylinder bore, wherein the piston reciprocates in the cylinder bore and defines a compression chamber in the cylinder bore, the piston having a rotation restrictor; and
- a swash plate, wherein the swash plate is coupled to the piston with a shoe such that rotation of the drive shaft is converted into reciprocation of the piston, the swash plate having a circumferential surface,
- wherein the first member includes the rotation restrictor of the piston, and the second member includes the circumferential surface of the swash plate.

12. The compressor according to claim 11, wherein the piston or the swash plate is made of an aluminum-based metal, and wherein the sliding film is formed on the aluminum-based metal with a middle layer made of anodized aluminum in between.

13. The compressor according to claim 1, further comprising:
- a housing in which a suction chamber, a discharge chamber, and a cylinder bore are defined;
- a drive shaft, which is rotatably supported by the housing;
- a piston housed in the cylinder bore, wherein the piston reciprocates in the cylinder bore and defines a compression chamber in the cylinder bore;
- a swash plate, wherein the swash plate is coupled to the piston with shoes such that rotation of the drive shaft is converted into reciprocation of the piston; and
- a rotary valve rotatably supported by the housing, wherein the rotary valve rotates integrally with the drive shaft, and the compression chamber is connected with the suction chamber through the rotary valve,
- wherein the first member includes the housing, and the second member includes the rotary valve.

14. The compressor according to claim 13, wherein the housing or the rotary valve is made of an aluminum-based metal, and wherein the sliding film is formed on the aluminum-based metal with a middle layer made of anodized aluminum in between.

* * * * *

UNITED STATES PATENT AND TRADEMARK OFFICE
CERTIFICATE OF CORRECTION

| | |
|---|---|
| PATENT NO. | : 7,156,014 B2 |
| APPLICATION NO. | : 10/870315 |
| DATED | : January 2, 2007 |
| INVENTOR(S) | : Sugioka et al. |

It is certified that error appears in the above-identified patent and that said Letters Patent is hereby corrected as shown below:

Column 1, line 67, please delete "slidn film" and insert therefore -- sliding film --;

Column 7, line 14, please delete "dilsocyanate" and insert -- diisocyanate --.

Signed and Sealed this
Twentieth Day of March, 2012

David J. Kappos
*Director of the United States Patent and Trademark Office*